United States Patent [19]
Weder et al.

[11] Patent Number: 5,740,664
[45] Date of Patent: Apr. 21, 1998

[54] SINGLE STATION COVERING AND FASTENING SYSTEM

[75] Inventors: Donald E. Weder; Joseph G. Straeter, both of Highland, Ill.; Paul Fantz, Imperial, Mo.

[73] Assignee: Southpac Trust International, Inc.

[21] Appl. No.: 795,536

[22] Filed: Feb. 5, 1997

Related U.S. Application Data

[63] Continuation of Ser. No. 462,342, Jun. 5, 1995, Pat. No. 5,636,502, which is a continuation of Ser. No. 252,876, Jun. 2, 1994, Pat. No. 5,609,009, which is a continuation-in-part of Ser. No. 88,692, Jul. 7, 1993, Pat. No. 5,481,850, which is a continuation-in-part of Ser. No. 819,311, Jan. 9, 1992, abandoned, which is a continuation of Ser. No. 765,416, Sep. 26, 1991, Pat. No. 5,105,599, which is a continuation of Ser. No. 530,491, May 29, 1990, abandoned, which is a continuation of Ser. No. 315,169, Feb. 24, 1989, abandoned, said Ser. No. 252,876, is a continuation-in-part of Ser. No. 88,976, Jul. 8, 1993, Pat. No. 5,450,707, and Ser. No. 979,389, Nov. 19, 1992, abandoned, which is a continuation of Ser. No. 832,096, Feb. 6, 1992, abandoned, which is a continuation-in-part of Ser. No. 765,416, Sep. 26, 1991, abandoned, which is a continuation of Ser. No. 530,491, May 29, 1990, abandoned, which is a continuation of Ser. No. 315,169, Feb. 24, 1989, abandoned.

[51] Int. Cl.⁶ ............... B65B 11/00; B65B 47/00
[52] U.S. Cl. ............... 53/580; 53/578; 53/220; 53/221
[58] Field of Search ............... 53/137.2, 138.1, 53/139.4, 399, 397, 449, 464, 414, 415, 209, 220, 221, 222, 223, 390, 580, 578

[56] References Cited

U.S. PATENT DOCUMENTS

| | | | |
|---|---|---|---|
| D. 295,525 | 5/1988 | Sakaki et al. | D15/145 |
| 1,994,962 | 3/1935 | Rushfeldt | 206/423 X |
| 2,133,278 | 10/1938 | Brodgen | 93/6 |
| 2,274,526 | 2/1942 | Bunn | 100/31 |
| 2,514,038 | 7/1950 | Doolittle | 53/414 X |
| 2,774,187 | 12/1956 | Smithers | 206/423 X |
| 2,882,660 | 4/1959 | Denton | 53/135 |
| 2,924,926 | 2/1960 | Paine | 53/585 X |
| 3,015,916 | 1/1962 | Denton | 53/3 |
| 3,186,333 | 6/1965 | Hoffman et al. | 100/9 |
| 3,318,230 | 5/1967 | Hilton | 100/4 |
| 3,849,972 | 11/1974 | Pepmeier et al. | 53/221 X |
| 3,965,655 | 6/1976 | Schooler et al. | 53/225 |
| 3,974,762 | 8/1976 | Kita et al. | 100/9 |
| 4,054,160 | 10/1977 | Knudsen | 140/93 |
| 4,086,117 | 4/1978 | Pearsall | 156/212 |

(List continued on next page.)

FOREIGN PATENT DOCUMENTS

| 4142206 | 5/1992 | Japan | 53/136.3 |
|---|---|---|---|

OTHER PUBLICATIONS

Rubber Band Technology Ltd., Yakima, Washington, Band-Master 102 model AF. Form RBT 9–88.

Rubber Band Technology, Ltd., Yakima, Washington, Band-Master 102 model ET. Form RBT 10–88.

Strapack Inc., Tokyo, Japan, Sivaron S–661 & 661Y. Copyright 1984 Strapack Corp.

(List continued on next page.)

*Primary Examiner*—Linda Johnson
*Attorney, Agent, or Firm*—Dunlap & Codding, PC

[57] ABSTRACT

An apparatus and method for forming a cover about an article and for automatically fastening the cover to the article, and optionally for automatically placing a label on the covered article. The article may be an article such as a potted plant and the cover may be a decorative cover. The invention satisfies the need for a means for rapidly covering and fastening the cover about an article with a minimal amount of manual effort and in a location having a limited amount of available space. The apparatus comprises a platform having at least one opening sized to receive the article. The apparatus comprises a tying device for automatically applying a band or fastener about a portion of the outer surface of the covered article for fastening the cover about the article after the sheet is formed into a cover about the article.

22 Claims, 15 Drawing Sheets

U.S. PATENT DOCUMENTS

| | | | |
|---|---|---|---|
| 4,143,594 | 3/1979 | Falcq | 100/7 |
| 4,362,096 | 12/1982 | Hanscom | 100/10 |
| 4,401,020 | 8/1983 | Brux | 100/7 |
| 4,525,983 | 7/1985 | Libow | 53/221 X |
| 4,570,415 | 2/1986 | Centeno | 53/399 |
| 4,711,071 | 12/1987 | Kagi | 53/589 |
| 4,733,521 | 3/1988 | Weder et al. | 53/580 |
| 4,773,182 | 9/1988 | Weder et al. | 47/72 |
| 4,835,834 | 6/1989 | Weder | 29/525 |
| 5,077,937 | 1/1992 | Weder et al. | 47/72 |
| 5,105,599 | 4/1992 | Weder | 53/399 |
| 5,111,638 | 5/1992 | Weder | 53/397 |
| 5,231,794 | 8/1993 | Weder et al. | 47/72 |
| 5,417,033 | 5/1995 | Weder | 53/399 |
| 5,426,914 | 6/1995 | Weder | 53/399 |
| 5,450,707 | 9/1995 | Weder | 53/414 |
| 5,465,552 | 11/1995 | Weder | 53/397 |
| 5,465,553 | 11/1995 | Weder | 53/397 |
| 5,471,816 | 12/1995 | Weder | 53/399 |
| 5,481,850 | 1/1996 | Weder | 53/414 |
| 5,531,058 | 7/1996 | Weder | 53/414 |
| 5,551,140 | 9/1996 | Weder | 53/397 |
| 5,588,277 | 12/1996 | Weder | 53/397 |
| 5,590,508 | 1/1997 | Weder | 53/399 |
| 5,609,009 | 3/1997 | Weder | 53/397 |
| 5,617,702 | 4/1997 | Weder | 53/399 |
| 5,623,807 | 4/1997 | Weder | 53/397 |
| 5,632,131 | 5/1997 | Weder | 53/399 |
| 5,636,502 | 6/1997 | Weder | 53/397 |

OTHER PUBLICATIONS

Strapack Inc., Tokyo, Japan, StraPack Semiautomatic Strapping Machine S–660. Copyright 1988 Strapack Corp.

Universal Strapping Corp., Uni–Pac Portable Strapping Kit (no date).

Cyklop Strapping Corp., Downingtown, PA, Cyklop EM–15 (2 pages). Copyright 1987, Cyklop Strapping Corporation.

Strapex Corp., Charlotte, NC. How to Strap Without Getting in a Bind (2 pages, no date).

Cyklop Strapping Corp., Downingtown, PA. ASM Series (2 pages). Copyright 1988 Cyklop Strapping Corporation.

Strapack Corp., Tokyo, Japan, StraPack Semiautomatic Strapping Machine, Sivaron S–662 (2 pages, no date).

Strapack Corp., Tokyo, Japan, StraPack Semiautomatic Polypropylene Strapping Machine, Sivaron SS–40 (2 pages, no date).

Strapack Corp., Tokyo, Japan. StraPack Semiautomatic Strapping Machines, Sivaron S–661 S661L (2 pages, no date).

Universal Strapping Corp., Brooklyn, NY, Universal Strapping Semiautomatic Plastic Strapping Machine, (2 pages, no date).

Universal Strapping Corp., Brooklyn, NY, Universal Strapping Extruders of Plastic Strapping (8 pages, no date).

Malow Corp., Mount Prospect, IL, Heavy Duty Tyer (2 pages, no date).

Rubber Band Technology, Ltd. Yakima, WA, Band Master 101, Model MF. Form RBT Aug. 1988.

Rubber Band Technology Ltd., Yakima, WA, Band Master, 201 Model B. Form RBT Dec. 1988.

B.H. Bunn Company, Alsip, IL, Strapping Efficiency for Every Strapping Application, brochure No. M20M–475 (6 pages, no date).

B.H. Bunn Company, Lakeland, FL, Bunn Models 1691, 1991, 2091, 2491, and 3091 Tying Machines brochure. Copyright 1992 (3 pages).

EAM Industries, W. Hazelton, PA, EAM Mosca Strapping System brochure (6 pages, no date).

EAM Industries, W. Hazelton, PA, COM Taping Machine brochure (2 pages, no date).

Clements Industries, Inc., South Hackensack, NJ, Tach–It Twisters, Packaging Machines . . . Bag Openers . . . Tape Winders . . . Bundlers advertisement (1 page, 1986).

Clements Industries, Inc., South Hackensack, NJ, Tach–It Twisters, Model 3558 advertisement (1 page, 1986).

InterPower Packaging, Hodgkins, IL, Akebono OB–300 brochure (2 pages, no date).

InterPower Packaging, Hodgkins, IL, Power 260 brochure (2 pages, 1991).

The John Henry Company, Cellocoup Brochure, copyright 1992 (4 pages).

Saxmayer Corporation, St. Blissfield, MI, Twine Tying Machines brochure (7 pages, no date).

Saxmayer Corporation, St. Blissfield, MI, Model 6 String Tyer brochure (2 pages, no date).

Saxmayer Corporation, St. Blissfield, MI, Model EM Route–Master brochure (2 pages, no date).

Felins, Inc., Milwaukee, WS, Pak–Tyer 2000 brochure (4 pages, 1991).

"Color Them Happy With Highlander Products", ©1992.

"Super Seller", Supermarket Floral, Sep. 15, 1992.

"Costa Keeps The Christmas Spirit", Supermarket, Sep. 15, 1992.

"Now, More Than Ever", Supermarket Floral, Sep. 15, 1992.

"Halloween", Link Magazine, Sep. 1992, 2 pages.

Speed Cover® Brochure, "The Simple Solution For Those Peak Volume Periods", Highland Supply Speed Cover® Brochure, ©1989, 6 pages.

"Speed Sheets® and Speed Rolls", Highland Supply Speed Sheets® Brochure, 1990©, 2 pages.

Olimex Brochure, 6 pages.

"A World of Cut Flower and Pot Plant Packaging", Klerk's Plastic Products Manufacturing Inc. Brochure, date unknown, 6 pages. Application admits that the products described in this brochure have been on sale at least more than one year prior to the filing of the present patent application.

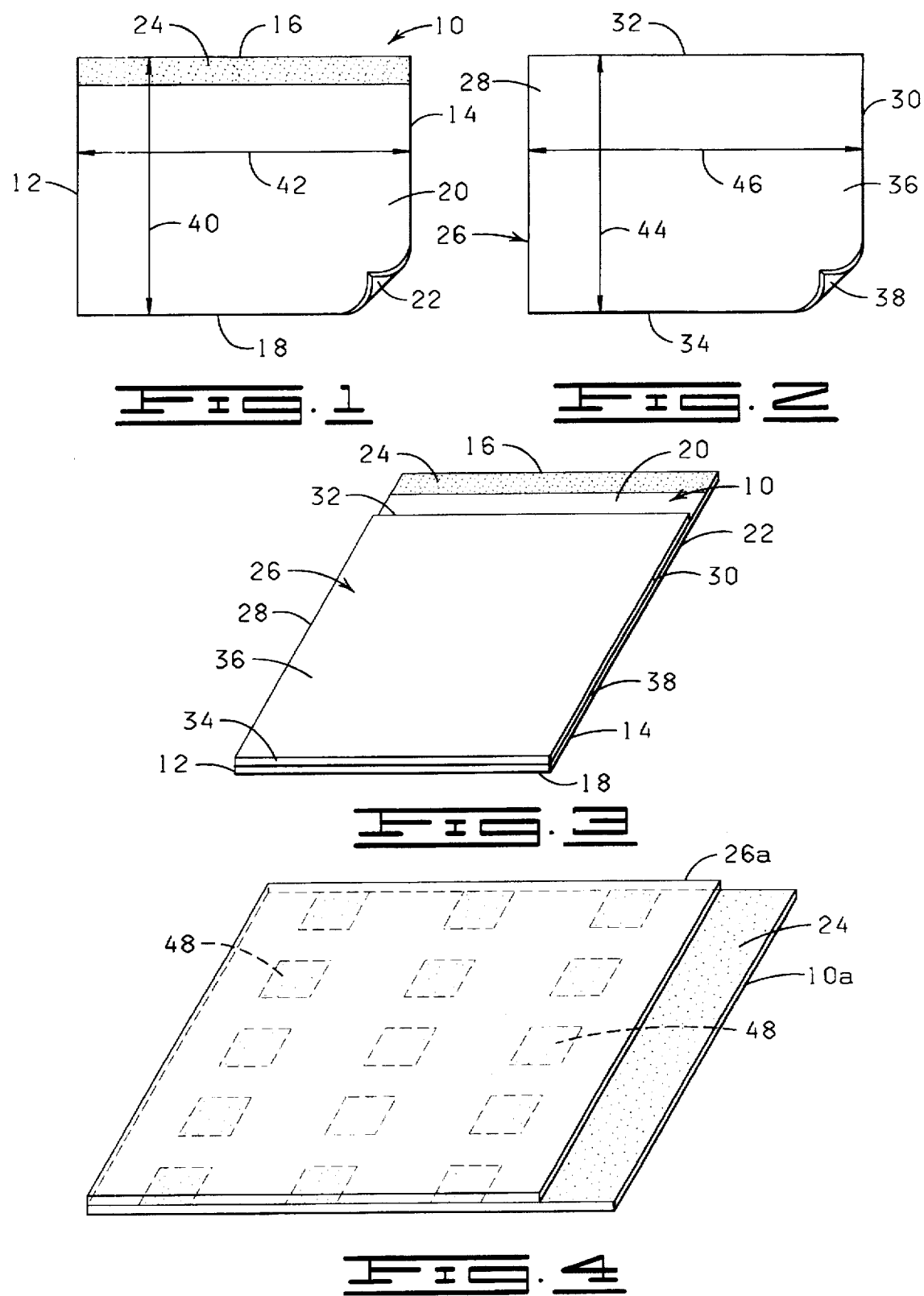

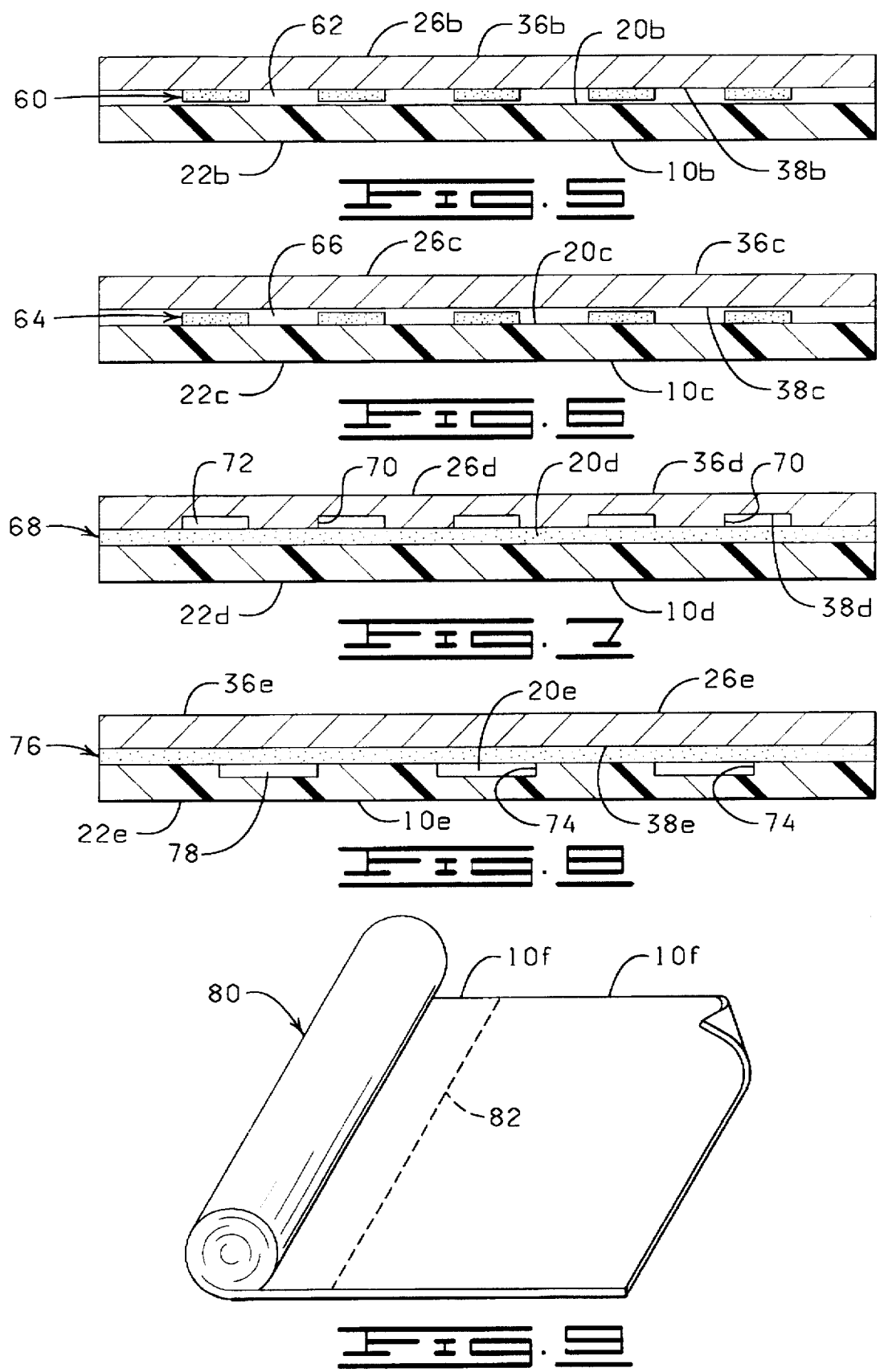

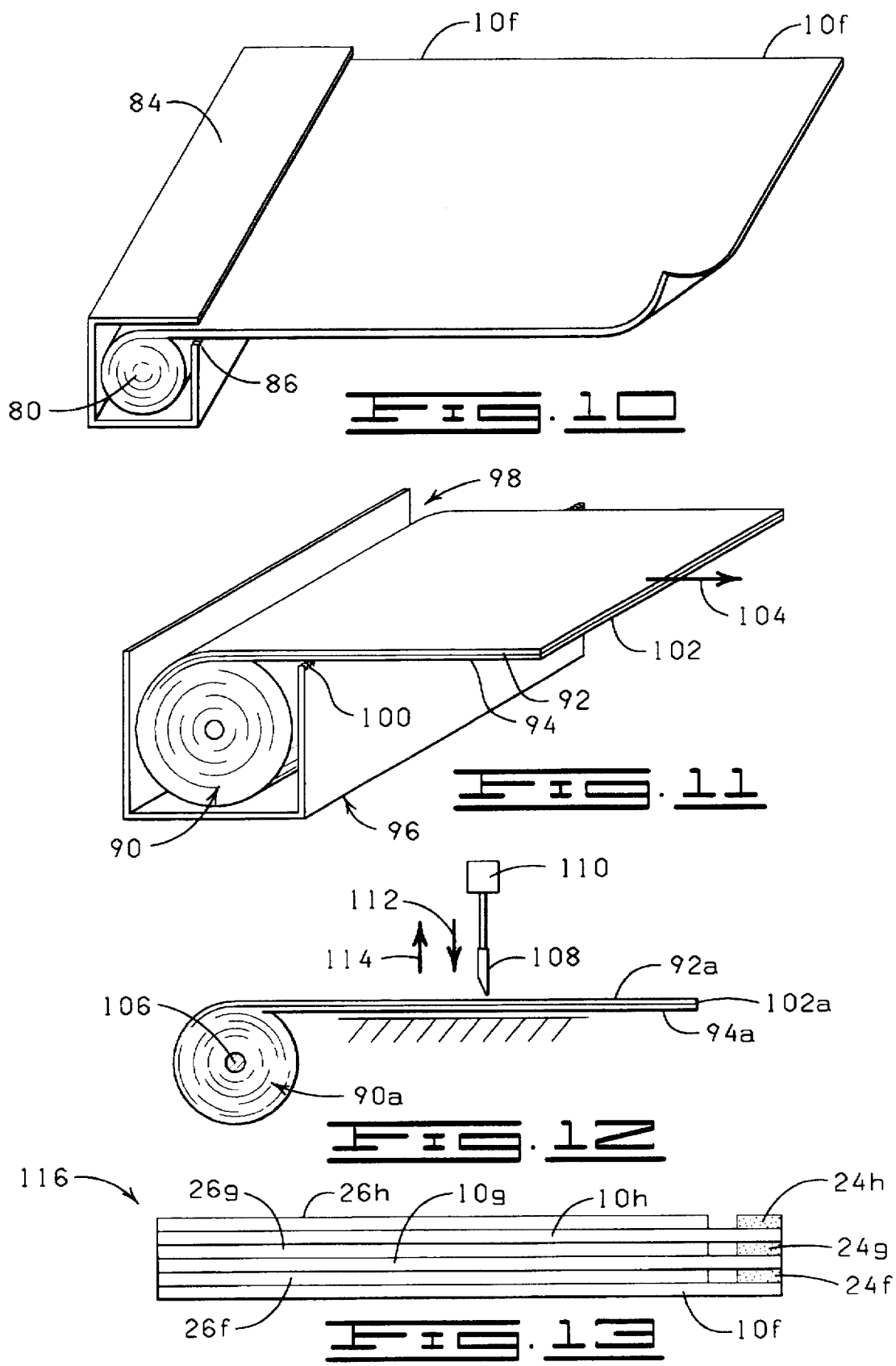

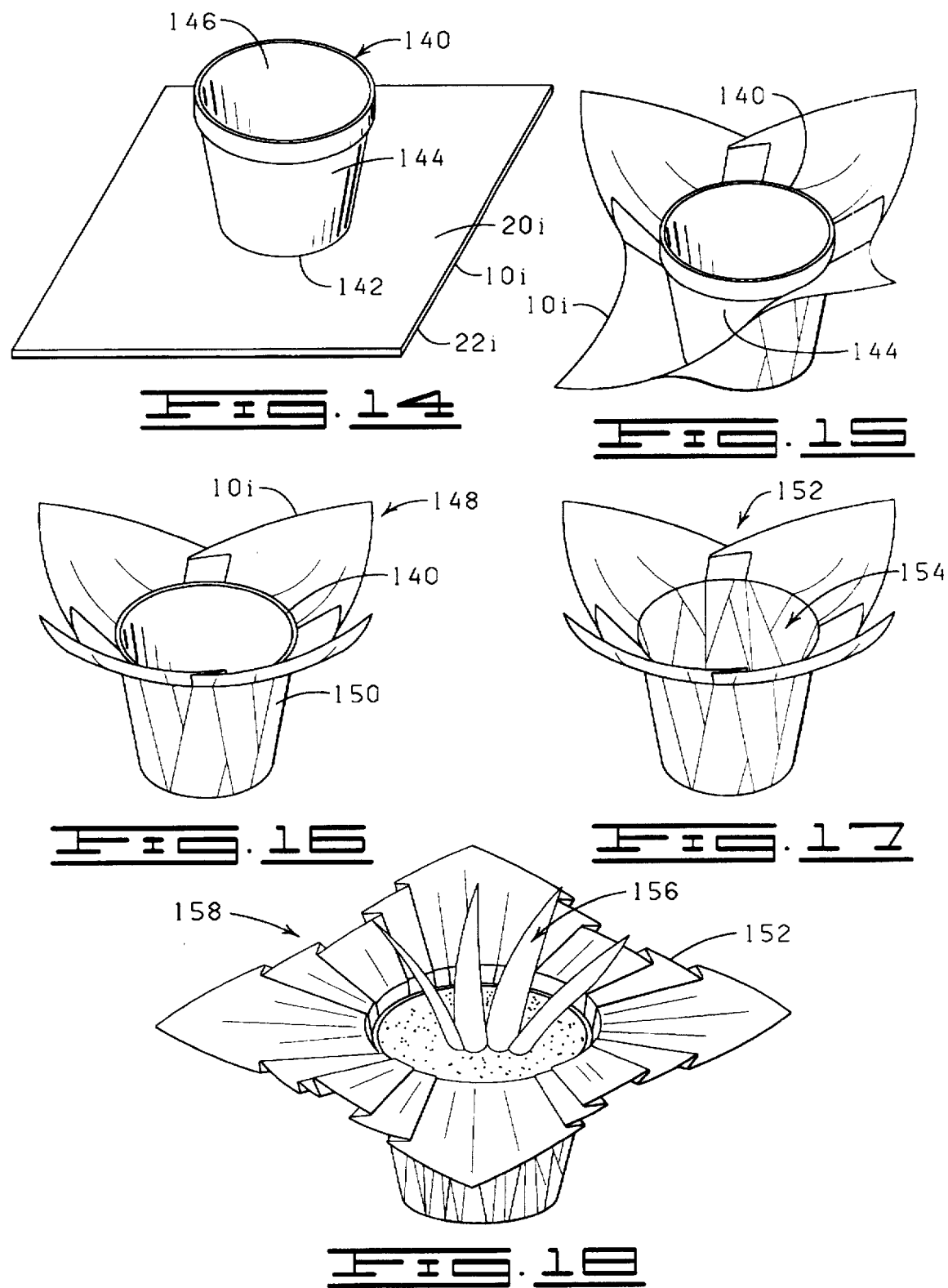

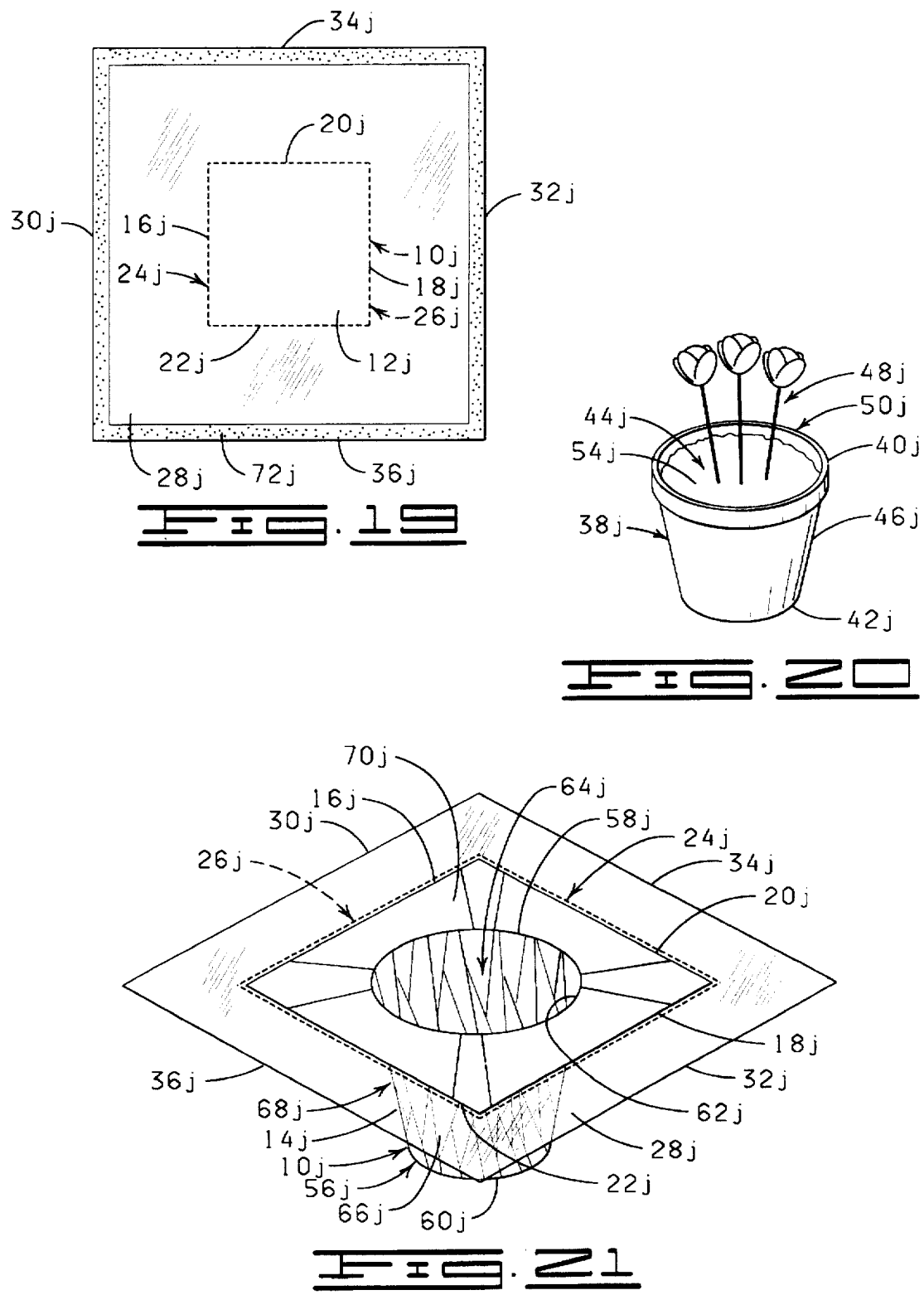

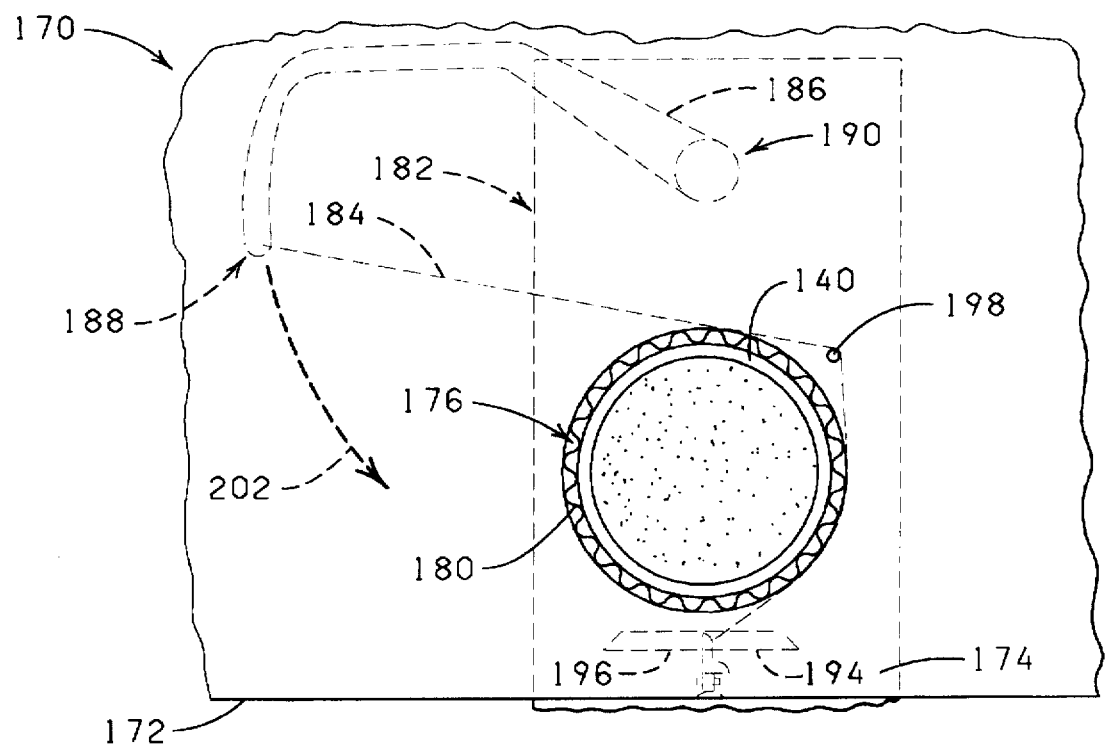
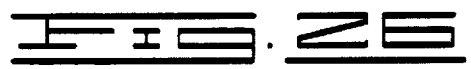
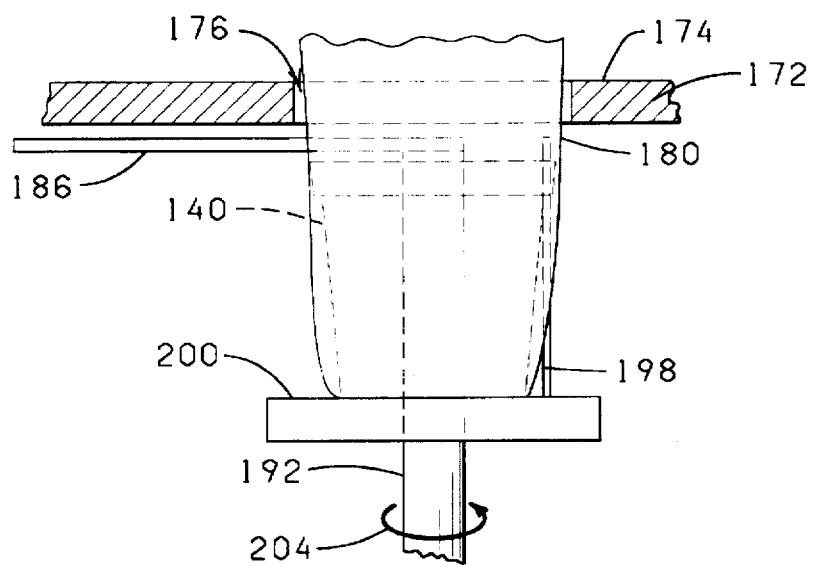
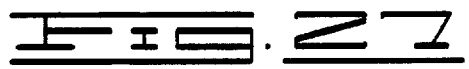

5,740,664

SINGLE STATION COVERING AND FASTENING SYSTEM

CROSS REFERENCE TO RELATED APPLICATIONS

This application is a continuation of U.S. Ser. No. 08/462,342, filed Jun. 5, 1995, entitled "SINGLE STATION COVERING AND FASTENING SYSTEM", now U.S. Pat. No. 5,636,502 issued Jun. 10, 1997, which is a continuation of U.S. Ser. No. 08/252,876, filed Jun. 2, 1994, entitled "SINGLE STATION COVERING AND FASTENING SYSTEM", now U.S. Pat. No. 5,609,009 issued Mar. 11, 1997, which is a continuation-in-part of U.S. Ser. No. 08/088,692, filed Jul. 7, 1993, entitled "ROTARY COVERING AND FASTENING SYSTEM", now U.S. Pat. No. 5,481,850; which is a continuation-in-part of U.S. Ser. No. 07/819,311, filed Jan. 9, 1992, entitled "MEANS FOR SECURING A DECORATIVE COVER ABOUT A FLOWER POT", now abandoned; which is a continuation of U.S. Ser. No. 07/765,416 filed Sep. 26, 1991, entitled "MEANS FOR SECURING A DECORATIVE COVER ABOUT A FLOWER POT", now U.S. Pat. No. 5,105,599, which is a continuation of U.S. Ser. No. 07/530,491 filed May 29, 1990, entitled "MEANS FOR SECURING A DECORATIVE COVER ABOUT A FLOWER POT", now abandoned; which is a continuation of U.S. Ser. No. 07/315,169, filed Feb. 24, 1989, entitled "MEANS FOR SECURING A DECORATIVE COVER ABOUT A FLOWER POT", now abandoned.

Said application U.S. Ser. No. 08/252,876 is also a continuation-in-part of U.S. Ser. No. 08/088,976 filed Jul. 8, 1993, entitled "CONVEYABLE COVER FORMER AND FASTENING SYSTEM", now U.S. Pat. No. 5,450,707.

Said application U.S. Ser. No. 08/252,876 filed Jun. 2, 1994, U.S. Pat. No. 5,609,009 is also a continuation-in-part of U.S. Ser. No. 07/979,389 filed Nov. 19, 1992, entitled "MEANS FOR SECURING A DECORATIVE COVER ABOUT A FLOWER POT", now abandoned; which is a continuation of U.S. Ser. No. 07/832,096 filed Feb. 6, 1992, entitled "MEANS FOR SECURING A DECORATIVE COVER ABOUT A FLOWER POT", now abandoned; which is a continuation-in-part of U.S. Ser. No. 08/765,416 filed Sep. 26, 1991, entitled "MEANS FOR SECURING A DECORATIVE COVER ABOUT A FLOWER POT", now abandoned; which is a continuation of U.S. Ser. No. 07/530,491 filed May 29, 1990, entitled "MEANS FOR SECURING A DECORATIVE COVER ABOUT A FLOWER POT", now abandoned; which is a continuation of U.S. Ser. No. 07/315,169, filed Feb. 24, 1989, entitled "MEANS FOR SECURING A DECORATIVE COVER ABOUT A FLOWER POT", now abandoned.

BACKGROUND

The present invention relates to an apparatus and method for placing a cover about an article, automatically applying a fastener about the covered article and removing the covered article at a single station, and more particularly, but not by way of limitation, to such apparatus and methods wherein the article is a potted plant.

DESCRIPTION OF THE DRAWINGS

FIG. 1 is a plan view of a first sheet of material with one end turned up and constructed in accordance with the present invention.

FIG. 2 is a plan view of a second sheet of material with one end turned up and constructed in accordance with the present invention.

FIG. 3 is a perspective view showing the first and the second sheets of material disposed adjacent each other.

FIG. 4 is a perspective view showing bonding areas on the surface of a first sheet or a second sheet which cause bonding of the second sheet and the first sheet.

FIG. 5 is a sectional view of a modified first and second sheets of material.

FIG. 6 is another cross-sectional view of a modified first sheet of material connected to a modified second sheet of material.

FIG. 7 is a cross sectional view of still another modified first sheet of material connected to a modified second sheet of material.

FIG. 8 is another cross-sectional view of yet another modified first sheet of material connected to a modified second sheet of material.

FIG. 9 is a diagrammatic view of a plurality of sheets of material, constructed in accordance with the present invention forming a continuous roll, the roll partially unrolled to reveal a single sheet still attached thereto.

FIG. 10 is a diagrammatic view of a plurality of sheets of material forming a continuous roll of material disposed in a dispenser.

FIG. 11 is a diagrammatic view showing a roll of material wherein the roll of material comprises a first and a second sheet of material constructed in accordance with the present invention disposed in a dispenser (diagrammatically shown in FIG. 11) for dispensing the first and the second sheets of material from the roll of material.

FIG. 12 is a diagrammatic view of a roll of material for dispensing a first and a second sheet of material constructed in accordance with the present invention from the roll of material.

FIG. 13 is a side elevational view of a pad of first and second sheets of material constructed in accordance with the present invention.

FIG. 14 is a perspective view of another embodiment of a sheet of material of the present invention, and a pot disposed upon the sheet.

FIG. 15 is a perspective view of the sheet of material of FIG. 14, showing a sheet of material partially wrapped about a flower pot.

FIG. 16 is a perspective view of the sheet of material wrapped about a flower pot.

FIG. 17 is a perspective view of a pre-formed decorative pot cover.

FIG. 18 is a perspective view of a potted plant wrapped by a sheet of material to form a covered potted plant.

FIG. 19 is a plan view of a sheet of material with a sheet extension connected thereto constructed in accordance with the present invention.

FIG. 20 is a partial perspective view of a flower pot having a floral grouping disposed therein.

FIG. 21 is a partial perspective view of the sheet of material formed into a pot cover with the sheet extension connected thereto.

FIG. 26 is a plan view of one version of the present invention which applies a band or fastener below the support surface.

FIG. 27 is a side elevational view of the apparatus of FIG. 26 as viewed from one angle.

DESCRIPTION OF THE PREFERRED EMBODIMENTS

Figure 22:
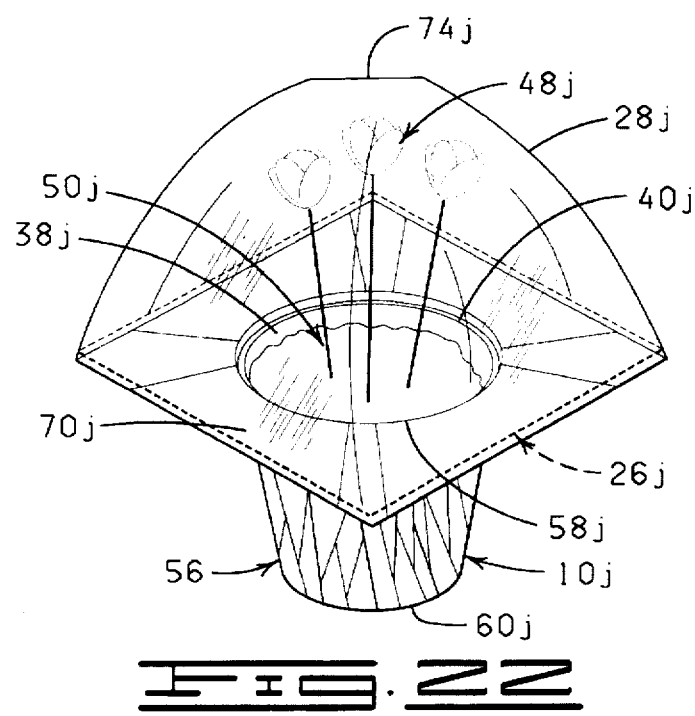
FIG. 22 is a partial perspective view showing the flower pot of FIG. 20 disposed in the pot cover of FIG. 21 with the sheet extension formed about the floral grouping.

The present invention comprises an apparatus for fastening a cover to an article, such as a potted plant.

In a preferred embodiment, the apparatus comprises a platform having an upper support surface formed thereon and at least one opening extending through the upper support surface. The upper support surface is adapted to support at least one sheet of material in a cover forming position over the opening. The opening is sized to accommodate a cover forming mold.

The apparatus further comprises a cover forming mold disposed below the opening in the support surface. The cover forming mold has contacting portions for contacting the sheet of material. The opening and the cover forming mold are adapted for receiving an article such as a flower pot having an upper end, a lower end, an upper opening and an outer peripheral surface such that when the article is moved in pre-determined direction, such as downward, the lower end of the article is caused to engage a portion of the sheet of material disposed over the opening. The article and portions of the sheet of material thus pass into the cover forming mold causing the sheet of material to engage the outer peripheral surface of the article and the contacting portions of the cover forming mold as the article is moved. As this happens, portions of the sheet contactingly engage or nearly engage the outer peripheral surface of the article forming a cover about the article and thereby forming a covered article. The cover of the covered article then has an inner surface facing the outer peripheral surface of the article and an exposed outer surface adjacent the inner portion of the mold.

The apparatus further comprises a fastening device for automatically applying a fastener about a portion of the outer surface of the covered article. The fastening device comprises a fastener retraction assembly for grasping and retracting the fastener for clearing the fastener from the opening to allow clearance for insertion of a pot or article into the opening. In an alternate version, the apparatus may comprise a labeling assembly for automatically applying a label to a portion of the outer surface of the cover of the covered article, preferably after the cover has been fastened to the article.

The sheet of material used in accordance with the present invention is constructed from a material selected from a group of materials described in greater detail below. The apparatus may further comprise a securing assembly for releasably securing the sheet of material in the cover forming position on the upper support surface for generally immobilizing the sheet prior to the forming step. The apparatus may further comprise a sheet feeder for automatically placing a sheet of material on the support surface and/or a pick an place assembly for picking up the article from an article supply and for placing the article into the opening to form the covered article. Additionally, the apparatus may further comprise a removal assembly for automatically removing the covered article from the opening of the platform.

The present invention further comprises a method for processing an article, such as a flower pot or potted plant. The first step comprises providing a platform such as described above which has an upper support surface formed thereon and at least one opening extending through the support surface. The opening is sized exactly as described above and has a cover forming mold disposed therein. Each cover forming mold has contacting portions and is sized to receive an article such as a potted plant which has an upper end, a lower end, an opening, and an outer peripheral surface.

The next step comprises placing a sheet of material in a cover forming position over the opening. The sheet of material, in the cover forming position, is positioned over the cover forming mold in the opening.

In the next step, a potted plant is covered with the sheet of material by positioning the potted plant in a position over the sheet of material and disposing the lower end of the pot generally above and near the portion of the sheet of material which is above the cover forming mold. The pot is moved in a direction which causes the lower end of the pot to engage a portion of the sheet of material. The sheet of material is thereby caused to contact or nearly contact both the outer peripheral surface of the pot and the contacting portions of the cover forming mold as the pot is moved. The sheet is pressed about the outer peripheral surface of the pot to form a cover about the pot. The cover has an inner surface facing the outer peripheral surface of the pot and an outer surface facing the interior of the mold.

Following this, a fastener is automatically applied about a portion of the outer surface of the covered pot for fastening the cover about the pot. Then, if a labeling assembly is included as a component of the apparatus a label is automatically applied to a portion of the outer surface of the cover of the covered pot for labeling the covered pot. Finally, the covered pot is removed from the opening. Alternatively, the step of automatically applying a label may occur prior to the step of automatically applying a fastener.

In an alternative embodiment, the step of placing a sheet of material on the support surface may be performed automatically using an automatic sheet feeding assembly. Also, the step of forming a covered article may be performed automatically by using an automatic pick and place assembly to pick up an article and place it into the opening to form the covered article. Additionally, the step of removing the covered article may further comprise automatically removing the covered article from the opening of the platform.

The machine may be located on any axis and may be portable or stationary. The machine can use pre-cut sheets fed manually or automatically with a dispenser which feeds a sized sheet from a roll to the proper working position on the machine table. The fastening apparatus may also tie the knot on a radius or on a tangent to the object.

The Embodiments of FIGS. 1–3

Shown in FIG. 1 and designated therein by the general reference numeral 10 is a sheet of material. The sheet of material 10 has a first end 12, a second end 14, a first side 16, a second side 18, an upper surface 20 and a lower surface 22.

A closure bonding material 24 may be disposed on the upper surface 20 of the sheet of material, alternatively, the sheet of material 10 may be free of a closure bonding material. As shown in FIG. 1, the closure bonding material 24, if present, may be disposed adjacent the first side 16 of the sheet of material 10 and extends between the first and the second ends 12 and 14 of the sheet of material 10 or it may be disposed on any other portion of the sheet 10. As shown in FIG. 1, the closure bonding material 24 is disposed on the upper surface 20 in a strip of closure bonding material 24, although the closure bonding material 24 also could be applied to the upper surface 20, of the sheet of material 10 in the form of spaced apart spots or the closure bonding material 24 also could be disposed on the upper surface 20 of the sheet of material 10 in any other geometric form and in any pattern including covering the entire upper surface 20 of the sheet of material 10. In this last-mentioned instance, the closure bonding material and the connecting bonding material would be contained within the bonding material covering the sheet of material 10. The term "spot" or "spots" includes any geometric shape of spot including, but not limited to, what is commonly referred to as strips.

The sheet of material 10 has a thickness in a range from about 0.1 mils to about 30 mils. Preferably, the sheet of material 10 has a thickness in arrange from about 0.1 mils to about 5 mils.

The sheet of material 10 may be any shape and a square or rectangular shape is shown in FIG. 1 only by way of example. The sheet of material 10 for example only may be square, rectangular, circular or any other geometric shape such as heart shaped, for example only.

The sheet of material 10 may be constructed of a single layer of material or a plurality of layers of the same or different types of materials. Any thickness of the sheet of material 10 may be utilized in accordance with the present invention as long as the sheet of material 10 is wrappable about an object, such as a plant or flower pot, as described herein. The layers of material comprising the sheet of material 10 may be connected together or laminated or may be separate layers.

Shown in FIG. 2 is a second sheet of material 26. The second sheet of material 26 has a first end 28, a second end 30, a first side 32, a second side 34, an upper surface 36 and a lower surface 38. The second sheet of material 26, if used is preferably constructed of paper. The term "paper" as used herein means treated or untreated paper, corrugated paper or cardboard or any other form of paper material.

The first sheet of material 10 has a length 40 extending between the first and the second sides 16 and 18 of the sheet of material 10. The first sheet of material 10 also has a width 42 extending between the first and the second ends 12 and 14 of the first sheet of material 10.

The second sheet of material 26 has a length 44 extending between the first and the second sides 32 and 34 of the second sheet of material 26. The second sheet of material 26 has a width 46 extending between the first and the second ends 28 and 30 of the second sheet of material 26. In a preferred embodiment, the length 44 of the second sheet of material 26 is less than the length 40 of the first sheet of material 10 as shown in FIG. 3 so that, when the first sheet of material 10 is disposed adjacent the second sheet of material 26, a portion of the first sheet of material 10 adjacent the first side 16 thereof extends a distance beyond the first side 32 of the second sheet of material 26, in a manner and for reason which will be described in greater detail below.

The first sheet of material has a thickness in a range from about 0.5 mils to about 30 mils and preferably the thickness of the first sheet of material is in a range from about 0.5 mils to about 10 mils. The first sheet of material 10 is constructed of a material which is flexible.

The second sheet of material 26 has a thickness in a range from about 0.1 mils to about 30 mils and preferably in a range from about 0.1 mils to about 10 mils. The second sheet of material 26 is flexible, but relatively rigid compared to the first sheet of material 10.

The second sheet of material 26 may be any shape and a square or rectangular shape is shown in FIG. 2 only by way of example. The second sheet of material for example only may be square, rectangular, circular or any other geometric shape.

The second sheet of material 26 may be constructed of a single layer of materials or a plurality of layers of the same or different types of materials. Any thickness of the second sheet of material 26 may be utilized in accordance with the present invention as long as the second sheet of material 26 is wrappable about an object such as a flower pot, as described herein, and as long as the second sheet of material 26 provides the rigidity described herein or the absorbency described herein or both. The layers of material comprising the second sheet of material 26 may be connected together or laminated or may be separate layers.

In operation, when a second sheet of material 26 is desired in addition to the first sheet of material 10, the second sheet of material 26 is placed adjacent the first sheet of material 10 as shown in FIG. 3. In this position, the lower surface 38 of the second sheet of material 26 is disposed adjacent the upper surface 20 of the first sheet of material 10. The width 42 of the first sheet of material 10 is about equal to the width 46 of the second sheet of material 26 so that, when the first and the second sheets of material 10 and 26 are disposed adjacent each other, the first end 28 of the second sheet of material is generally aligned with the first end 12 of the first sheet of material 10, the second end 30 of the second sheet of material 26 is generally aligned with the second end 14 of the first sheet of material 10, the second side 18 of the first sheet of material 10 is generally aligned with the second side 34 of the second sheet of material and the first side 16 of the first sheet of material 10 extends a distance beyond the first side 32 of the second sheet of material 26 so that the closure bonding material 24 on the upper surface 20 of the first sheet of material 10 is exposed and not covered by the second sheet of material 26.

It should be noted that the first and the second sheets of material 10 and 26 each could have virtually identical lengths 40 and 44. In this case, the second sheet of material 26 is disposed on the first sheet of material 20 in such a manner that the second side 34 of the second sheet of material 26 extends a distance beyond the second side 18 of the first sheet of material 10 whereby the first side 16 of the first sheet of material 10 is spaced a distance from the first side 32 of the second sheet of material 26 thereby leaving the closure bonding material 24 on the first sheet of material 10 exposed and not covered by the second sheet of material 26. And multiple sheets of material 10 and 26 may be used. Moreover, when multiple sheets of material 10 and 26 are used in combination, the sheets of material 10 and 26 need not be uniform in size or shape. Finally, it will be appreciated that the sheets of material 10 and 26 shown in all embodiments herein are substantially flat.

As noted earlier, a closure bonding material may be disposed on the upper surface of the first sheet of material 10. The closure bonding material 24 may be applied as a strip or as spots or other shapes. One method for disposing a closure bonding material, in this case an adhesive, is described in U.S. Pat. No. 5,111,637 entitled "Method For Wrapping A Floral Grouping" issued to Weder et al., on May 12, 1992 and which is hereby incorporated herein by reference.

The first sheet of material 10 can be utilized alone or in combination with the second sheet of material 26 to wrap a potted plant or flower pot. The term "flower pot" refers to any type of container used for holding a floral grouping or a potted plant. Examples of flower pots used in accordance with the present invention are clay pots, plastic pots, and the like. "Floral grouping" as used herein means cut fresh flowers, artificial flowers, a single flower other fresh and/or artificial plants or other floral materials and may include other secondary plants and/or ornamentation or artificial or natural materials which add to the aesthetics of the overall floral arrangement. The floral grouping comprises a bloom or foliage portion and a stem portion. However, it will be appreciated that the floral grouping may consist of only a single bloom or only foliage (not shown). The term "floral grouping" may be used interchangeably herein with the term "floral arrangement".

The first sheet of material 10 or the second sheet of material 26 may be constructed of a single layer of material or a plurality of layers of the same or different types of materials. Any thickness of the sheet of material 10 or 26 may be utilized in accordance with the present invention as long as the sheet of material 10 or 26 may be wrapped or formed about at least a portion of a portion of a flower pot, as described herein. Additionally, an insulating material such as bubble film, preferable as one of two or more layers, can be utilized in order to provide additional protection for the item wrapped therein.

In a preferred embodiment, the first sheet of material 10 is constructed from two polypropylene films (a 20"×15" sheet of Mobil 270 ABW white opaque film laminated to a 20"×15" sheet of Mobil 220 AB clear film) having a thickness in a range of from less than about 1.0 mil to about 2.5 mils. The layers of material comprising the first sheet of material 10 may be connected together or laminated or may be separate layers.

The sheet of material 10 is constructed from any suitable wrapping material that is capable of being wrapped about a flower pot or floral grouping, as the case may be. Preferably, the wrapping material 10 comprises paper (untreated or treated in any manner), cellophane, foil, polymer film, fabric (woven or nonwoven or synthetic or natural), burlap, or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The sheet of material 10 or 26 may vary in color. Further, the sheet of material 10 or 26 may consist of designs or decorative patterns which are printed, etched, and/or embossed thereon using inks or other printing materials. An example of an ink which may be 10 applied to the surface of the sheet of material 10 or 26 is described in U.S. Pat. No. 5,147,706 entitled "Water Based Ink On Foil And/Or synthetic organic polymer" issued to Kingman on Sep. 15, 1992 and which is hereby incorporated herein by reference. In addition, the sheet of material 10 or 26 may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the sheet of material 10 or 26. Moreover, each surface of the sheet of material 10 or 26 may vary in the combination of such characteristics. The sheet of material 10 or 26 itself may be opaque, translucent or partially clear or tinted transparent.

Embodiments of FIGS. 4-8

Referring now to FIG. 4, a bonding material may be applied to either the upper surface of a first sheet of material 10a or to the lower surface of a second sheet 26a of material in a plurality of patches 48 for the purpose of bonding the upper surface of the first sheet 10a to the lower surface of the second sheet 26a.

Shown in FIG. 5 is a modified first sheet of material 10b connected to a modified second sheet of material 26b. The first sheet of material 10b is constructed exactly like the sheet of material 10. The second sheet of material 26b is constructed like the sheet of material 26 described in detail before and shown in FIG. 2, except the second sheet of material 26b includes a bonding material 60 disposed on the lower surface 38b of the second sheet of material 26b. The bonding material 60 is in the form of a plurality of spaced apart spots of bonding material 60, similar to that shown in FIG. 4. The lower surface 38b of the second sheet of material 26b is bondingly connected to the upper surface 20b of the first sheet of material 10b by way of the bonding material 60. Since the bonding material 60 is in the form of a plurality of spaced apart spots, a plurality of spaced apart spaces 62 (only one of the spaces 62 being designated by reference numeral in FIG. 5) are formed between the lower surface 38b of the second sheet of material 26b and the upper surface 20b of the first sheet of material 10b. The spaces 62 provide air gaps which form an insulation when the first and the second sheets of material 10b and 26b are wrapped about a flower pot in a manner and for reasons like that described herein.

Shown in FIG. 6 is a modified first sheet of material 10c connected to a modified second sheet of material 26c. The first sheet of material 10c is constructed exactly like the sheet of material 10 shown in FIG. 1, except the first sheet of material 10c includes a bonding material 64 disposed on the upper surface 20c of the first sheet of material 10c. The bonding material 64 is in the form of a plurality of spaced apart spots of bonding material 64, similar to that shown in FIG. 5. The lower surface 38c of the second sheet of material 26c is bondingly connected to the upper surface 20c of the first sheet of material 10c by way of the bonding material 64. Since the bonding material 64 is in the form of a plurality of spaced apart spots, a plurality of spaces 66 (only one of the spaces 66 being designated by a reference numeral in FIG. 6) are formed between the lower surface 38c of the second sheet of material 26c and the upper surface 20c of the first sheet of material 10c. The spaces 66 provide air gaps which form an insulation when the first and the second sheets of material 10c and 26c are wrapped about a flower pot in a manner and for reasons like that described herein in connection with FIG. 5.

Shown in FIG. 7 is a modified first sheet of material 10d connected to a modified second sheet of material 26d. The first sheet of material 10d is constructed exactly like the sheet of material shown in FIG. 1, except the first sheet of material 10d includes a bonding material 68 on the upper surface 20d thereof. The second sheet of material 26d is constructed exactly like the second sheet of material 26 shown in FIG. 2, except the second sheet of material 26d includes a plurality of spaced apart raised portions 70. The raised portions 70 may be formed by embossing the second sheet of material 26d or forming corrugations in the second sheet of material 26d or in any other manner desired in any particular application.

The upper surface 20d of the first sheet of material 10d is disposed generally adjacent the lower surface 38d of the second sheet of material 20d or, more particularly, adjacent the raised portions 70 on the second sheet of material 26d. In this position, the raised portions 70 are bonded to the upper surface 20d of the first sheet of material 10d by way of the bonding material 68 to connect the first sheet of material 10d to the second sheet of material 20d.

The spaced apart raised portions 70 on the second sheet of material 26d form a plurality of spaces 72 between the first sheet of material 10d and the second sheet of material 26d in a connected position of the first and the second sheets of material 10d and 26d for providing insulation when the first and second sheets of material 10d and 26d are connected together and wrapped about a flower pot in a manner like that described herein.

Shown in FIG. 8 is a modified first sheet of material 10e connected to a modified second sheet of material 26e. The first sheet of material 10e is constructed exactly like the sheet of material 10 shown in FIG. 1, except the first sheet of material 10e includes a plurality of spaced apart raised portions 74. The raised portions 74 may be formed in the first sheet of material 10e by embossing the first sheet of material 10e or forming corrugations in the first sheet of material 10e or in any other suitable manner. The second sheet of material 26e is constructed exactly like the second sheet of material 26 shown in FIG. 2, except the second sheet of material 26e includes a bonding material 76 disposed on the lower surface 38e thereof.

In operation, the upper surface 20e of the first sheet of material 10e is disposed generally adjacent the lower surface 38e of the second sheet of material 26e or, more particularly, the raised portions 74 on the first sheet of material 10e are disposed adjacent the lower surface 38e of the second sheet of material 26e. In this position, the first sheet of material 10e is bondingly connected to the second sheet of material 26e by way of the bonding material 76 on the second sheet of material 26e or, more particularly the bonding material 76 on the second sheet of material 26e bondingly engages and bondingly connects to the raised portions 74 on the first sheet of material 10e to connect the first sheet of material 10e to the second sheet of material 26e. In this connected position of the first sheet of material 10e and the second sheet of material 26e, the raised portions 74 cooperate to form a plurality of spaces 76. Between the first sheet of material 10e and the second sheet of material 26e. The spaces 76 cooperate to provide an insulation when the first and the second sheets of material 10e and 26e are wrapped about a flower pot in a manner and for reasons like that described herein.

Embodiments of FIGS. 9–10

Referring now to FIG. 9, a plurality of individual sheets of material 10f are connected linearly together to form a roll 80. Preferably, the plurality of sheets of material 10f in the roll 80 are connected by perforations 82, as illustrated in FIG. 9. Such a roll 80 permits one sheet of material 10f to be withdrawn from the roll 80, then severed or disconnected from the roll 80. Alternatively, as shown in FIG. 10, the roll 80 may simply be formed as a continuous roll 80 of wrapping material without perforations, wherein a plurality of sheets of material 10f may be removed from the roll 80 by unrolling a portion of the roll 80, and using a separate cutting element (not shown) to sever the unrolled portion of the roll 80 of material to form the sheet of material 10f. The roll 80 may also be contained within a dispenser 84, as illustrated in FIG. 10. When the roll 80 is disposed in the dispenser 84, a portion of the wrapping material is again unrolled, and a serrated cutting edge 86 contained within the dispenser 84, or a separate cutting element (not shown), severs the unrolled portion of the wrapping material from the roll 80 to form a sheet of material 10f. Any number of sheets of material 10f may form the roll 80 as long as it is possible to withdraw at least one sheet 10f from the roll 80 as described herein.

Embodiments of FIGS. 11–12

The first and the second sheets of material described herein can be provided in the form of a roll of first and second sheets of material wherein the first and the second sheets of material are unrolled from the roll of first and second sheets of material and the first and the second sheets of material are severed from the roll either by perforations at spaced apart locations in the roll or by cutting the first and the second sheets of material from the roll. It also should be noted that additional sheets of material may be combined with the first and the second sheets of material if so desired in a particular application.

Shown in FIG. 11 is a roll of material 90 comprising a first material 92 and a second material 94 with the second material 94 being disposed adjacent the first material 92. The first material 94 is constructed of any of the materials described before with respect to the first sheet of material. The second material 94 is constructed of any of the materials described before with respect to the second sheet of material.

The roll of material 90 is disposed in a dispenser 96 having an opening 98 through which the materials 92 and 94 may be withdrawn from the roll of material 90. A cutting edge 100 is disposed on the dispenser 96 near the opening 98. The cutting edge 100 may be a sawtooth type of edge, as shown in FIG. 11, or the cutting edge 100 may be any other type of edge or device suitable for cutting a portion of the materials 92 and 94 from the roll of material 90 and the cutting edge 100 may be connected to the dispenser 96 or may be a separate component if desired in particular application.

The roll of material 90 has a leading edge 102. In operation, the leading edge 102 is gripped or a portion of the first and/or the second materials are gripped and the first and the second materials are unrolled and withdrawn from the roll of material 90 in a direction 104. The first and the second materials 92 and 94 are withdrawn or unrolled from the roll of material 90 until a desired length of the first and the second materials 92 and 94 have been withdrawn from the roll of material 90. In this position, a portion of the first and the second materials 92 and 94 are disposed adjacent the cutting edge 100. The first and the second materials 92 and 94 then are maneuvered to pass the first and the second materials 92 and 94 over the cutting edge 100 thereby is severing a portion of the material extending a distance from the leading edge 102 thereof from the roll of material 90. The portion of the first and the second materials 92 and 94 withdrawn from the roll of material 90 and severed from the roll of material 90 comprise the first and the second sheets of material as described herein.

The first and the second materials 92 and 94 in the roll of material 90 may be connected or unconnected. Further, the roll of material 90 may comprises two rolls of material with one of the rolls of material comprising the first material 92 and the other roll of material comprising the second material 94. In this last-mentioned embodiment, the first material 92 is withdrawn from the first roll of material and the second material 94 is withdrawn from the second roll of material about simultaneously so that the first and the second materials 92 and 94 are provided in a manner as generally shown in FIG. 11 for severing from the first and second rolls of material to provide the first and the second sheets of material as described herein. The term "roll of material" as used herein is intended to encompass two or more rolls in the manner generally described.

Shown in FIG. 12 is a modified roll of material 90a comprising a first material 92a and a second material 94a with a leading edge 102a. The roll of material 90a is constructed exactly like the roll of material 90 described before, except the roll of material 90a is not disposed in a dispenser constructed like the dispenser 96 shown in FIG. 11. Rather, the roll of material 90a is supported on a generally mounted shaft 106. The first and the second sheets of material 92a and 94a are withdrawn from the roll of material 90a in a manner like that described before in connection with FIG. 11 until a predetermined length of the first and the second materials 92a and 94a have been withdrawn from the roll of material 90a. In this position, a portion of the first and the second materials 92a and 94a are disposed under a knife edge 108. The knife edge 108 is connected to an actuator 110 adapted to move the knife edge 108 in a direction 112 and in a direction 114. When the predetermined length of the first and the second materials 92a and 94a have been withdrawn from the roll of material 90a, the actuator 110 actuates to move the knife edge 108 in the direction 112 to a position wherein the knife edge 108 severingly engages the materials 92a and 94a to severingly cut a portion of the first and the second materials 92a and 94a from the roll of materials 90a to provide the first and the second sheets of material as described herein. The actuator 110 may comprise a hydraulic or pneumatic cylinder or a motor and gear arrangement or any other form of arrangement suitable for moving the knife edge 108 in the directions 112 and 114. After the knife edge 108 has cuttingly severed the desired portion of the first and the second sheets of material 92a and 94a from the roll of material 90a, the actuator 110 is actuated to move the knife edge 108 in the direction 114 to a storage position disposed a distance above the first and the second materials 92a and 94a as opposed to the cutting position previously described.

Embodiment of FIG. 13

Shown in FIG. 13 is a pad 116 of first sheets of materials designated by the reference numerals 10f, 10g, and 10h in FIG. 13 and a plurality of second sheets of material designated in FIG. 13 by the reference numerals 26f, 26g and 26h. The first sheets of material 10f, 10g and 10h may be constructed like the sheet of material 10 shown in FIG. 1 and described in detail beforehand the second sheets of material 26f, 26g and 26h may be constructed like the second sheet of material 26 shown in FIG. 2 and described in detail before, or like any of the other first and the second sheets of material described herein. The first and the second sheets of material 30f, 10g, 10h, 26f, 26g and 26h are connected in the form of a pad 116 with the closure bonding material 24f, 24g and 24h cooperating to connect the first sheets of material 10f, 10g and 10h in the form of the pad 116. The second sheets of material 26f, 26g and 26h may be connected to the respective first sheets of material 10f, 10g and 10h or may be interleaved between the adjacent first sheets of material 10f, 10g and 10h in the pad 116. In the alternative, the second sheets of material 26f, 26g and 26h may be connected to form the pad 116 with the first sheets of material 10f, 10g and 10h being interleaved in the respective second sheets of material 26f, 26g and 26h and/or connected thereto. In operation, one of the first sheets of material 10f, 10g or 10h along with the adjacent second sheet of material 26f, 26g and 26h may be removed from the pad 116 and then placed in position to be wrapped about the flower pot.

Embodiments of FIGS. 14–18

As noted above, a first sheet of material 10 or a first sheet 10 and a second sheet of material 26 may be used to provide a decorative cover for an object such as a flower pot or a potted plant. To cover the object, the sheet or sheets may be manually or automatically placed in a position to be formed about the outer peripheral surface of the pot or potted plant as described in more detail below. Or, the sheet or sheets may be formed into a preformed cover which is then placed in a position to receive the pot or potted plant.

Referring to FIG. 14, to form a sheet of material 10i into a cover about a pot 140, the sheet of material 10i is disposed above an opening in a platform. The pot 140 is then disposed upon the upper surface 20i of the sheet of material 10i, so the lower end 142 of the pot 140 rests upon the portion of the upper surface 20i which is over the opening. The pot 140 has an outer peripheral surface 144 and an upper end 146. In one embodiment of a manual application of the sheet 10i about the pot 140, the pot 140 is manually pushed in a direction into the opening covered by the sheet 10i. The upper surface 20i of the sheet of material 10i is caused to be pressed about the outer peripheral surface 20i (FIG. 15) thereby engaging the outer peripheral surface 20i to form a cover 148 about the pot 140 as shown in FIG. 16. The lower surface 22i of the sheet of material 10i thereby becomes the outer surface 150 of the cover 148.

Another method for wrapping the sheet of material 10i about a pot 140 for forming such a cover is shown in U.S. Pat. No. 4,733,521, entitled "Cover Forming Apparatus" issued to Weder et al., on Mar. 29, 1988, which is hereby incorporated herein by reference.

A cover 148 formed by wrapping the sheet of material 10i about the flower pot 140 may be secured to the outer peripheral surface 144 of the pot 140 by, the use of one or more bonding materials described herein. One particular method of securing the cover 148 to the pot 140 is by applying a band about the pot 140 to hold the covering in place such as is described in U.S. Pat. No. 5,105,599 entitled "Means For Securing A Decorative Cover About A Flower Pot" issued to Weder on Apr. 21, 1992, and which is hereby incorporated herein by reference.

Alternatively, the sheet of material may be preformed into a cover 152 having an opening 154 as shown in FIG. 17. The cover 152 is self-supporting by virtue of overlapping folds which are bonded to each other, thereby forming a rigid structure. The preformed cover 152 may be deposited into an opening in a table or platform to support the cover 152. A potted plant 156 can then be disposed into the opening 154 of the preformed cover 152, thereby resulting in a covered potted plant 158 as shown in FIG. 18.

One method for forming such a preformed plant cover or pot cover is shown in U.S. Pat. No. 4,773,182 entitled "Article Forming System" issued to Weder et al., on Sep. 27, 1988, which is hereby incorporated herein by reference.

Embodiments of FIGS. 19–22

Referring to FIG. 19, as shown therein and designated by the general reference numeral 10j is another sheet of material constructed in accordance with the present invention. The sheet of material 10j shown in FIG. 19 has an upper surface 12j, a lower surface 14j (FIG. 21), a first end 16j, a second end 18j, a first side 20j and a second side 22j. The ends 16j and 18j cooperate with the sides 20j and 22j to define an outer peripheral surface 24j of the sheet of material 10j. The outer peripheral surface 24j of the sheet of material 10j is defined by perforations 26j, as shown in FIGS. 19, 21 and 22.

As shown in FIGS. 19, 21 and 22, a sheet extension 28j is connected to the outer peripheral surface 24j of the sheet of material 10j. As shown in FIGS. 19 and 21, the sheet extension 28j extends a distance outwardly from the outer peripheral surface 24j of the sheet of material 10j. The sheet extension 28j has a first end 30j, a second end 32j, a first side 34j and a second side 36j. A portion of the sheet extension 28j extends a distance outwardly from the first end 16j of the sheet of material 10j terminating with the first end 30j of the sheet extension 28j. Another portion of the sheet extension 28j extends a distance outwardly from the second end 18j of the sheet of material 10j terminating with the second end 32j of the sheet extension 28j. Yet another portion of the sheet extension 28j extends a distance outwardly from the first side 20j of the sheet of material 10j terminating with the first side 34j of the sheet extension 28j. Still another portion of the sheet extension 28j extends a distance outwardly from the second side 22j of the sheet of material 10j terminating with the second side 36j of the sheet extension 28j.

The sheet extension 28j cooperates with the sheet of material 10j to define a generally square or rectangularly shaped sheet with the perforations 26j being disposed in a central portion of the sheet and defining the outer peripheral surface 24j of the sheet of material 10j. Preferably, the sheet of material 10j and the sheet extension 28j are unitary and formed from a single sheet or plies or multiple sheets one on top of the other which may or may not be laminated.

The sheet of material 10j and the sheet extension 28j are constructed from any suitable flexible material that is capable of being wrapped about a floral grouping and formed into the covering, as described herein. Preferably, the sheet of material 10j and the sheet extension 28j are constructed of a material selected from a group of materials consisting of paper, metal foil, cloth (natural or synthetic), denim, burlap or polymer film as defined above or combinations thereof.

The sheet of material 10j and the sheet extension 28j have a thickness in a range from about 0.1 mils to about 30 mils. Preferably, the sheet of material 10j and the sheet extension 28j have a thickness in a range from about 0.1 mils to about 5 mils.

The sheet of material 10j and the sheet extension 28j may be any shape and a rectangular shape is shown in FIG. 19 only by way of example. The sheet of material 10j and the sheet extension 28j for example only may be square, rectangular, circular or any other geometric shape such as heart shaped for example only.

The sheet of material 10j and the sheet extension 28j may be constructed of a single layer of material or a plurality of layers of the same or different types of materials. Any thickness of the sheet of material 10j and the sheet extension 28j may be utilized in accordance with the present invention as long as the sheet of material 10j and the sheet extension 28j is wrappable about a floral grouping and formable into the covering, as described herein. The layers of material comprising the sheet of material 10j and the sheet extension 28j may be connected together or laminated or may be separate layers.

The covering of the present invention is particularly constructed to be used with a pot 38j (FIG. 20). The pot 38j has a top 40j, a bottom 42j with an opening through the top 40j forming a receiving space 44j within the pot 38j. The pot 38j also has an outer peripheral surface 46j. As shown in FIG. 20, the pot 38j is generally cylindrically shaped. However, the pot 38j may be any shaped as may be desired in a particular application.

A floral grouping 48j is disposed at least partially within the receiving space of the pot 38j, as shown in FIG. 20. The floral grouping 48j has a stemmed end 50j and a bloom end 52j. In one embodiment as shown in FIG. 20, material such as soil 54j is disposed in the receiving space 44j and a portion of the stem end 50j extends into the soil 54j. The floral grouping extends a distance upwardly from the top 40j of the pot 38j terminating with the bloom end 52j.

The sheet extension 28j is transparent, although a decorative pattern also may be applied to the sheet extension 28j.

The sheet of material 10j with the sheet extension 28j connected thereto is placed between a male and a female die or other forming means and formed into a pot cover 56j (FIG. 21). As shown in FIGS. 21 and 22, the pot cover 56j has a top 58j, a closed bottom 60j and a cover opening 62j (FIG. 21) formed through the top 58j and extending through the top 58j a distance toward the bottom 60j of the pot cover 56j providing a pot receiving space 64j (FIG. 21). The pot receiving space 64j is shaped and adapted to receive the pot 38j.

The pot cover 56j has a plurality of overlapping folds 66j (FIG. 21) with each of the overlapping folds 66j extending at various distances and at various angles over an outer peripheral surface 68j (FIG. 21) of the pot cover 56j extending between the top 58j and the bottom 60j. The overlapping folds 66j extend at various angles and over various distance over the outer peripheral surface 68j.

The pot cover 56j includes a skirt 70j (FIGS. 21 and 22). The skirt 70j extends from the top 40j of the pot 38j radially outwardly with an outer peripheral surface of the skirt 70j being formed by the outer peripheral surface 24j of the sheet of material 10j. The perforations 26j extend along the outer peripheral surface of the skirt 70j formed by the outer peripheral surface 24j of the sheet of material 10j.

The overlapping folds 66j may be connected or at least partially connected. The connection of the overlapping folds may be accomplished by using heat sealing material and heat sealing the overlapping folds or by adhesively or cohesively connecting the overlapping folds.

The pot 38j is placed in the pot receiving space 64j and positioned in the pot cover 56j such that the bottom 42j of the pot 38j is disposed generally adjacent the bottom 60j of the pot cover 56j. The pot cover 56j substantially encompasses the entire outer peripheral surface 46j of the pot 38j including the bottom 42j. The pot cover 56j extends from the bottom 42j to the top 40j of the pot 38j. The skirt 70j extends radially outwardly from the top 40j of the pot 38j.

After the pot 38j has been placed in the pot cover 56j, the skirt extension 28j is formed about the floral grouping 48j to a position wherein the sheet extension 28j covers and encompasses a substantial portion of the floral grouping including the bloom end of the floral grouping.

The sheet extension 28j preferably includes a bonding material 72j (FIG. 19) disposed on the upper surface of the sheet extension 28j and extending about the outer peripheral surface of the sheet extension 28j. After the sheet extension 28j has been formed about the floral grouping 48j, the ends of the sheet of material are bonded together to provide a closed end 74j (FIG. 22). The term "bonding material" as used herein is as defined below.

The sheet extension 28j remains in a position extending about the floral grouping 48j until it is desired to remove the sheet extension 28j. The sheet extension 28j is removed from the pot cover 56j by tearing along the perforations 26j separating the sheet extension 28j from the pot cover 56j. The sheet extension 28j then is removed from the floral grouping 48j leaving the pot cover 56j providing a decorative cover for the pot 38j.

In addition to the perforations 26j, the sheet extension 28j also may include perforations extending between the perforations 26j and the outer peripheral surface of the sheet extension 28j to further assist in the removal of the sheet extension 28j when it is no longer desired to keep the sheet extension 28j extending about the floral grouping 48j.

Figure 23:
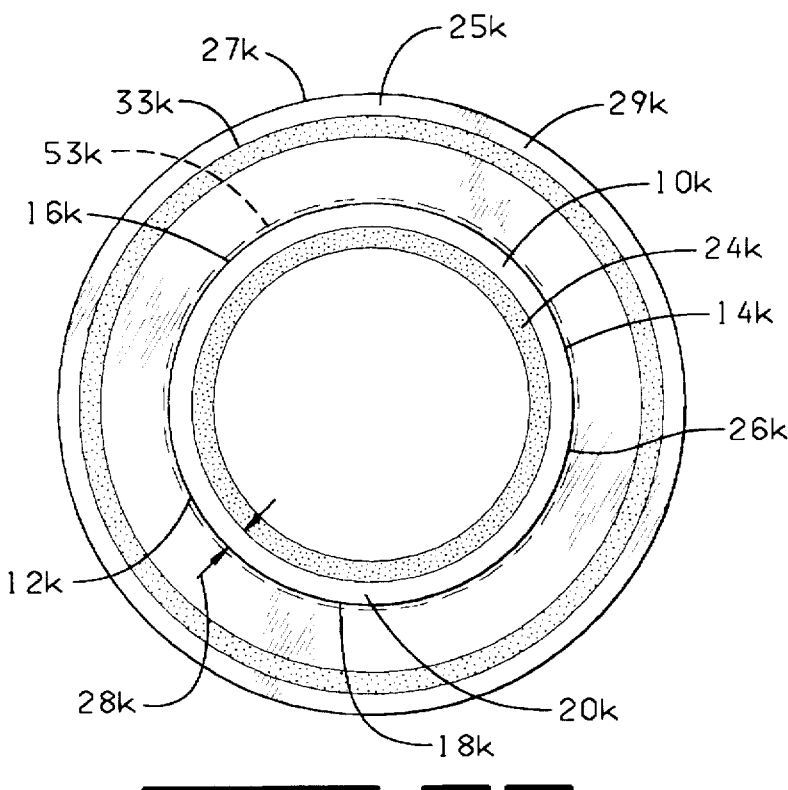
FIG. 23 is a plan view showing the upper surface of another sheet of material with a sheet extension connected thereto constructed in accordance with the present invention.
Figure 24:
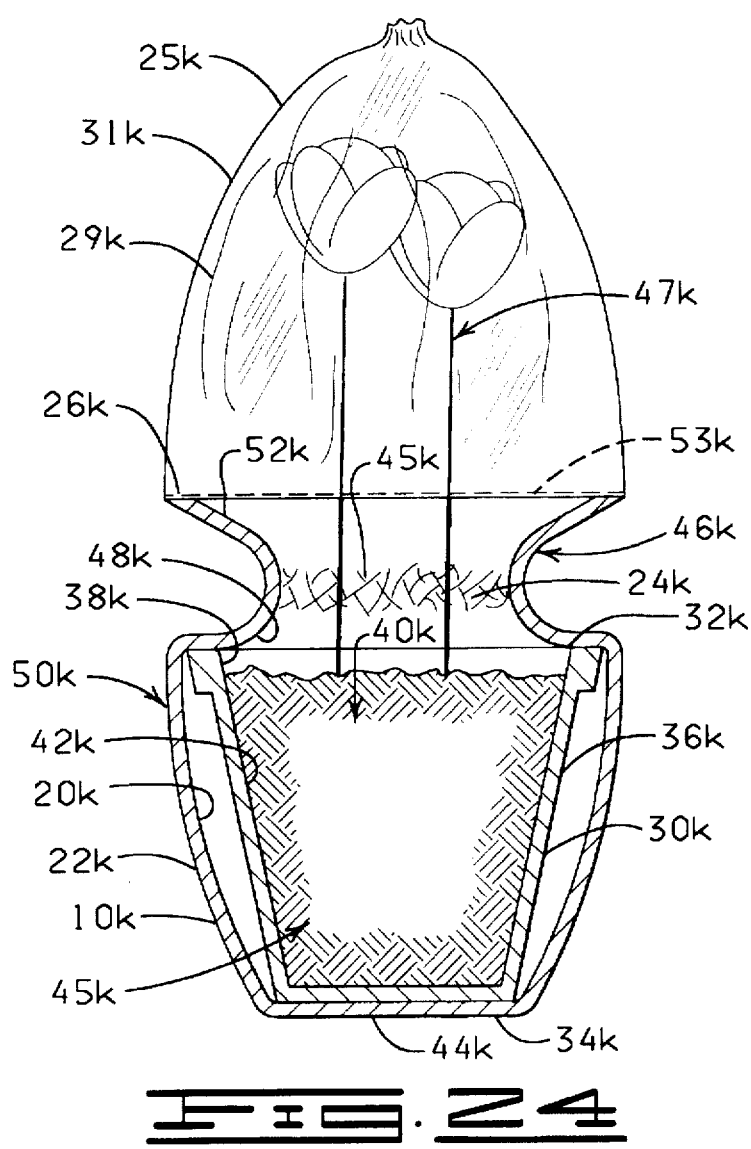
FIG. 24 is a sectional view showing the sheet of material of FIG. 23 crimpingly formed about a flower pot and the sheet extension formed about a floral grouping to provide a protective covering.

Shown in FIG. 23 and designated by the general reference number 10k is a sheet of material constructed in accordance with the present invention. The sheet of material 10k includes a first end 12k, a second end 14k, a first side 16k and a second side 18k. The sheet of material 10k also includes an upper surface 20k (FIG. 23) and a lower surface 22k (FIG. 24).

A connecting bonding material 24k is disposed on the upper surface 20k of the sheet of material 10k. The sheet of material 10k has an outer peripheral surface 26k. The connecting bonding material 10k is disposed near and spaced a distance 28k from the outer peripheral surface 26k of the sheet of material 10k and extends generally circumferentially about the sheet of material 10k.

The sheet of material 10k shown in FIG. 23 is circularly shaped and the connecting bonding material 24k extends in a circularly shaped pattern over the upper surface 20k of the sheet of material 10k. The sheet of material 10k may be any geometric shape such as square or rectangular or heart shaped or trapezoidally shaped or any other geometric shape. Further, the connecting bonding material 24k may extend in any geometric pattern over the upper surface 20k of the sheet of material 10k, and the circularly shaped pattern is shown in FIG. 23 only by way of example.

A sheet extension 25k is connected to the sheet of material 10k. The sheet extension 25k extends about the outer peripheral surface 26k of the sheet of material 10k. The sheet extension 25k extends outwardly from the sheet of material 10k terminating with an outer peripheral surface 27k. The sheet extension 25k has an upper surface 29k (FIG. 23) and a lower surface 31k (FIG. 24). The upper surface 29k is disposed in a plane about coplanar with the upper surface 22k of the sheet of material 10k and lower surface 31k is disposed in a plane about coplanar with the lower surface 22k of the sheet of material 10k.

The sheet extension 25k and the sheet of material 10k may be integrally constructed of a single sheet of material or the sheet extension 25k may be laminated to the sheet of material 10k. A connecting bonding material 33k is disposed on the upper surface 29k of the sheet extension 25k. The connecting bonding material 33k is disposed near and spaced a distance from the outer peripheral surface 27k of the sheet extension 25k and extends generally circumferentially about the sheet extension 25k.

The sheet extension 25k is shown in FIG. 23 as being circularly shaped. The sheet extension 25k may be any geometric shape such as a square or rectangular or heart shaped or trapezoidally shaped or any other geometric shape and the geometric shape of the sheet extension 25k may be the same as the geometric shape of the sheet of material 10k or the sheet extension 25k may have a geometric shape different from the geometric shape of the sheet of material 10k. Further, although the sheet extension 25k is shown in FIG. 23 as extending circumferentially about the outer peripheral surface 26k of the sheet of material 10k, the sheet extension 25k may extend only about a portion of the outer peripheral surface 26k of the sheet of material 10k or the sheet extension 25k may comprise segments with each segment extending about a portion of the outer peripheral surface 26k of the sheet of material 10k.

The sheet of material 10k and the sheet extension 25k may be constructed of a single layer of material or a plurality of layers of the same or different types of materials as described above. Any thickness of the sheet of material 10k and the sheet extension 25k may be utilized in accordance with the present invention as long as the sheet of material 10k and the sheet extension 25k are wrappable or formable about a flower pot or a floral grouping in the manners described herein. The layers of material comprising the sheet of material 10k and the sheet extension 25k may be connected together or laminated or may be separate layers. A decorative pattern, such as a color and/or an embossed pattern, and/or other decorative surface ornamentation may be applied to the upper surface 20k and/or the lower surface 22k of the sheet of material 10k or portions thereof as described above.

A decorative pattern, such as a color and/or an embossed pattern, and/or other decorative surface ornamentation may be applied to the upper surface 29k and/or the lower surface 31k of the sheet extension 25k or portions thereof as described above. The sheet extension 25k also may be totally or partially clear or tinted transparent material as described above.

The connecting bonding materials 24k and 33k are shown in FIG. 23 as being applied to the upper surface 20k or the upper surface 29k in the form of a circularly shaped strip. The connecting bonding materials 24k or 33k may be applied in the form of spots or spaced apart strips and the spots may be any geometric pattern or any other type of pattern such as a logo for example. Further, the connecting bonding materials 24k or 33k may include a color to obscure the fact that the connecting bonding materials 24k and 33k are disposed on the sheet of material 10k or the sheet extension 25k.

Shown in FIG. 24 is a flower pot 30k having an upper end 32k, a lower end 34k and an outer peripheral surface 36k. An opening 38k is formed through the upper end 32k of the flower pot 30k providing access to a retaining space 40k.

The retaining space 40k forms an inner peripheral surface 42k in the flower pot 30k. A bottom 44k of the flower pot 30k is disposed at the lower end 34k and cooperates to enclose or partially enclose the retaining space 40k. The flower pot 30k may be any conventional, commercially available container well known in the art.

Growing medium 45k is shown in FIG. 24 disposed in the retaining space 40k and a floral grouping 47k is shown in FIG. 24 partially disposed in the growing media 45k. A portion of the floral grouping 47k extends a distance upwardly above the upper end 32k of the flower pot 30k.

The flower pot 30k is placed on the upper surface 20k of the sheet of material 10k. More particularly, the bottom 44k of the flower pot 30k is disposed on a central portion of the sheet of material 10k. In this position, the connecting bonding material 24k extends circumferentially about the flower pot 30k and the connecting bonding material 24k is spaced a distance from the flower pot 30k.

The sheet of material 10k then is formed about the flower pot 30k to a position wherein the sheet of material 10k extends about and encompasses substantially the entire outer peripheral surface 36k of the flower pot 30k, including the bottom 44k. It should be noted that the sheet of material 10k does not have to cover the bottom 44k. In this position, a portion of the sheet of material 10k is disposed adjacent the bottom 44k of the flower pot 10k and portions of the sheet of material 10k extend upwardly and encompass the entire outer peripheral surface 36k of the flower pot 30k between the upper end 32k and the lower end 34k of the flower pot 10k. In one embodiment, the portions of the sheet of material 10k extending over the outer peripheral surface 36k are spaced a distance from the outer peripheral surface 36k of the flower pot 30k to provide a blossom type affect.

In this position, the portion of the sheet of material 10k disposed near and about the connecting bonding material 24k is crimped by bringing together portions of the sheet of material 10k near and about the connecting bonding material 24k so that portions of the sheet of material 10k near and about the connecting bonding material 24k are disposed adjacent each other and the adjacent portions of the sheet of material 10k are connected by way of the connecting bonding material 24k thereby forming a plurality of overlapping folds 45k in the portion of the sheet of material 10k near and about the connecting bonding material 24k. The connected overlapping folds 45k extend at various distances and at various angles. The connected overlapping folds 45k (FIG. 24) in the area near and about the portion of the sheet of material 10k containing the connecting bonding material 24k is designated in FIG. 24 by the reference numeral 46k and maybe referred to herein as the crimped portion 46k (FIG. 24).

Figure 25:
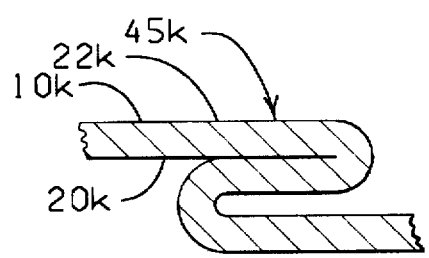
FIG. 25 is a sectional view of a portion of the sheet of material crimped to form an overlapping fold.

A typical section showing a portion of a typical overlapping fold 45k is shown in FIG. 25. The adjacent portions of the sheet of material 10k on the upper surface 20k are shown in FIG. 25 as being connected while the adjacent portions of the sheet of material 10k on the lower surface 22k are unconnected since no bonding material is disposed on the lower surface 22k. It should be noted that connecting bonding material also can be disposed on the lower surface 22k for connecting adjacent portions of the lower surface 22k in the crimped portion 46k if desired and as described in more detail below.

The crimped portion 46k extends circumferentially about the upper end 32k of the flower pot 30k. The crimped portion 46k also extends a distance inwardly from the upper end 32k of the flower pot 30k toward a central portion of the retaining space 40k thereby forming a ridge portion 48k extending circumferentially about the flower pot 30k generally near the upper end 32k of the flower pot 30k. The crimped portion 46k and the ridge portion 48k thereof cooperate to engage the upper end 32k of the flower pot 30k to assist and cooperate in holding the sheet of material 10k formed about the flower pot 30k to provide a decorative cover 50k (FIG. 24).

The crimped portion 46k when formed preferably causes adjacent portions of the upper and lower surfaces 20k and 22k of the sheet of material 10k to be brought together or positioned adjacent each other. The crimped portion 46k and the other crimped portions shown in the drawings are shown in an expanded form where the portions of the lower surface 22k are not disposed adjacent each other for the purpose of illustration and because this expanded form may be desired in some applications.

Either before or after or during the forming of the crimped portion 46k, the sheet extension 25k is formed about the floral grouping 47k to a position wherein the sheet extension 25k encompasses a substantial portion of the floral grouping 47k, as shown in FIG. 24. The sheet extension 25k extends upwardly about the floral grouping 47k with a portion of the sheet extension 25k extending upwardly beyond the upper end of the floral grouping 47k terminating with the outer peripheral surface 27k of the sheet extension 25k and forming an open upper end. In this position of the sheet extension 25k, portions of the sheet extension 25k near the outer peripheral surface 27k (the open upper end) thereof are brought into contact thereby bringing the bonding material 33k into contact and engagement with adjacent portions of the sheet extension 25k for closing the sheet extension 25k about or above an upper end of the floral grouping 47k.

In a preferred form, a line of perforations 53k (FIGS. 23 and 24) is formed between the sheet of material 10k and the sheet extension 25k. The line of perforations 53k extends generally about the outer peripheral surface 26k of the sheet of material 10k. The sheet extension 25k encompasses the floral grouping 47k and provides a protective covering for the floral grouping 47k to protect the floral grouping 47k during shipment and/or storage. When it is desired to remove the protective covering provided by the sheet extension 25k, the operator tears the sheet extension 25k along the line of perforations 53k thereby severing or separating the sheet extension 25k from the sheet of material 10k so that the sheet extension 25k can be removed from the sheet of material 10k or, in other words, the protective covering may be removed from the decorative covering by tearing along the line of perforations 53k.

The term "bonding material" when used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the sheet of material and, in this instance, heat, sound waves, or vibrations, also must be applied to effect the sealing.

The term "bonding material" when used herein also means any type of material or thing which can be used to effect the bonding or connecting of the two adjacent portions of the material or sheet of material to effect the connection or bonding described herein. The term "bonding material" also includes ties, labels, bands, ribbons, strings, tape, staples or combinations thereof. Some of the bonding materials would secure the ends of the material while other bonding material may bind the circumference of the wrapper. Another way to secure the wrapping is to heat seal the ends of the material to another portion of the material. One way to do this is to contact the ends with an iron of sufficient heat to heat seal the material.

The term "bonding material" when used herein also means any heat or chemically shrinkable material, and static electrical or other electrical means, magnetic means, mechanical or barb-type fastening means or clamps, curl-type characteristics of the film or materials incorporated in the sheet of material which can cause the material to take on certain shapes, and any type of welding method which may weld portions of the sheet to itself or to the pot, or to both the sheet itself and the pot.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "band" when used herein means any material which may be secured about an object such as a flower pot, such bands commonly being referred to as elastic bands, rubber bands or non-elastic bands and also includes any other type of material such as an elastic or non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about an object such as the flower pot. The band also may include a bow if desired in a particular application.

The sheet of material used herein may further comprise at least one scent (not shown). Examples of scents utilized herein include (but are not limited to) floral scents (flower blossoms, or any portion of a plant), food scents (chocolate, sugar, fruits), herb or spice scents (cinnamon), and the like. Additional examples of scents include flowers (such as roses, daisies, lilacs), plants (such as fruits, vegetables, grasses, trees), foods (for example, candies, cookies, cake), food condiments (such as honey, sugar, salt), herbs, spices, woods, roots, and the like, or any combination of the foregoing. Such scents are known in the art, and are commercially available.

The scent may be disposed upon the sheet of material 10 by spraying the scent thereupon, painting the scent thereupon, brushing the scent thereupon, lacquering the scent thereupon, immersing the sheet of material in a scent-containing liquid, exposing the sheet of material to scent-containing gas, or any combination thereof.

The scent may be contained within a lacquer, or other liquid, before it is disposed upon the sheet of material 10. The scent may also be contained within a dye, ink, and/or pigment (not shown). Such dyes, inks and pigments are known in the art, and are commercially available, and may be disposed upon or incorporated in the sheet of material 10 by any method described herein or known in the art.

Figure 28:
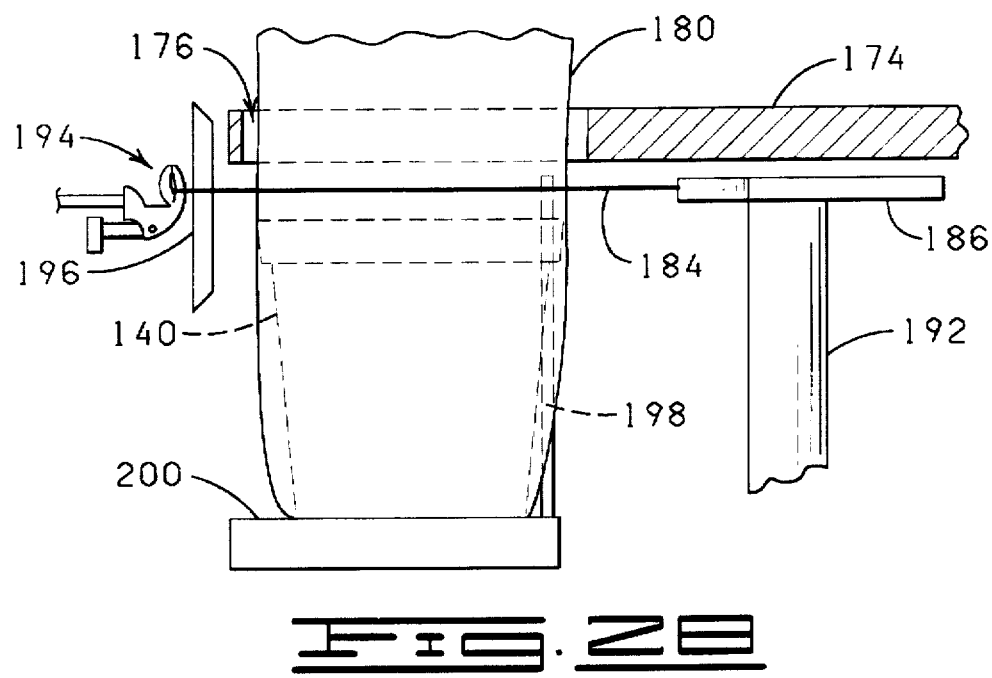
FIG. 28 is a side elevational view of the apparatus of FIG. 26 as viewed from a second angle.

Embodiments of FIGS. 26–28

In one version, the apparatus of the present invention comprises a platform having an upper support surface formed thereon and at least one opening extending through the upper support surface. The upper support surface is adapted to support at least one sheet of material in a cover forming position over the opening. The opening is sized to accommodate a cover forming mold.

The apparatus further comprises a cover forming mold disposed below the opening in the support surface. The cover forming mold has contacting portions for contacting the sheet of material. The opening and the cover forming mold are adapted for receiving an article such as a flower pot having an upper end, a lower end, an upper opening and an outer peripheral surface such that when the article is moved in a pre-determined direction, such as downward, the lower end of the article is caused to engage a portion of the sheet of material disposed over the opening. The article and portions of the sheet of material thus pass into the cover forming mold causing the sheet of material to engage the outer peripheral surface of the article and the contacting portions of the cover forming mold as the article is moved. As this happens, portions of the sheet contactingly engage or nearly engage the outer peripheral surface of the article forming a cover about the article and thereby forming a covered article. The cover of the covered article then has an inner surface facing the outer peripheral surface of the article and an exposed outer surface adjacent the inner portion of the mold.

The apparatus further comprises a fastening device for automatically applying a fastener about a portion of the outer surface of the covered article. In an alternate version, the apparatus may comprise a labeling assembly for automatically applying a label to a portion of the outer surface of the cover of the covered article, preferably after the cover has been fastened to the article.

The sheet of material used in accordance with the present invention is constructed from a material selected from a group of materials described in greater detail below. The apparatus may further comprise a securing assembly for releasably securing the sheet of material in the cover forming position on the upper support surface for generally immobilizing the sheet prior to the forming step. The apparatus may further comprise a sheet feeder for automatically placing a sheet of material on the support surface and/or a pick an place assembly for picking up the article from an article supply and for placing the article into the opening to form the covered article. Additionally, the apparatus may further comprise a removal assembly for automatically removing the covered article from the opening of the platform.

Referring now to FIG. 26, a portion of a covering and fastening assembly designed in accordance with the present invention is generally designated by the reference numeral 170. The covering and fastening assembly 170 is mounted upon a framework (not shown) which may be mobile or stationary. The assembly 170 comprises an upper platform 172 which has an upper support surface 174 and an opening 176.

A sheet of material (such as sheet 26 in FIG. 2) is manually placed upon the upper support surface 174 generally over the opening 176 in the upper support surface 174. The sheet of material may be obtained from a stack of sheets such as shown in FIG. 13, or may be obtained from a sheet dispenser such as shown in FIGS. 10–12 and discussed above. In one alternate version of the invention, the sheet of material may be automatically fed from a sheet feeding apparatus (not shown). Automatic sheet feeding devices are well known in the art. Examples of such sheet feeding machines are shown in U.S. Pat. Nos. 4,887,805 issued to Herbert et al., 4,889,331 issued to Sardella, and 5,090,676 issued to Matsumo et al. An automatic sheet feeding machine, if used, is detachably connected to the framework of the apparatus of the present invention.

In a preferred version of the invention, a cover former (not shown) is detachably mounted in each opening 176. Examples of cover formers contemplated in accordance with the present invention are disclosed in U.S. Pat. No. 4,733,521 as discussed above, and are hereby incorporated herein by reference.

An article or potted plant or pot such as pot 140 may be delivered to the apparatus manually or automatically. When the operation is manual, a pot 140 or a potted plant such as the potted plant 156 is disposed above the sheet of material and is pushed downward into the opening 176, through the cover former disposed therein, forming the sheet of material into a cover 180 about the potted plant.

Alternatively, the potted plant 156 may be deposited into the cover forming position by a pick and place machine (not shown) which is an apparatus for grasping an article from a plurality of stored articles, delivering the article to the correct position above a sheet of material and then automatically depositing the article into the opening 176, and disengaging from the article once the article is deposited into the opening 176. Such pick and place machines are familiar to persons of ordinary skill in the art of object pickup and placement.

Once a pot 140 or potted plant 156 has had a cover 180 applied thereabout, a fastening assembly 182 serves to apply a fastener 184 about the cover 180 which has been applied about the pot 140 or potted plant 156. Examples of fastening machines include tying machines such as those commercially available from Saxmeyer, Bunn, Felins, and Cyclops.

The fastening machine 182 is mounted upon the mobile or stationary framework.

In the embodiment represented in FIGS. 26–28, the fastening assembly 182 is constructed to apply a fastener or band to the covered article or pot in a plane beneath the upper support surface 174. The fastening assembly 182 comprises a tie arm 186 having a tie end 188 and a pivot end 190, a tie arm shaft 192, a knotter head 194, a rocker plate 196 and a vertical rod 198 mounted to a lower support assembly 200. A string, tie, wire, or other type of band or fastener 184 is drawn through the knotter head 194 and engaged with the tie end 188 of the tie arm 186. The fastener 184 is looped outside of the vertical rod 198 as shown in FIG. 26 which serves as a fastener retraction assembly so that the stress of the fastener 184 upon the cover 180 is relieved so as not to tear the cover 180. The tie arm 186 is rotated by the tie arm shaft 192 in a direction 202 when the tie arm shaft 192 is rotated in a direction 204 by a drive motor (not shown) of the fastening assembly 182.

An optional labeling apparatus (not shown) is a separate unit which can be mounted and removed from the main framework of the covering and fastening assembly 170. Such labeling devices are known by persons of ordinary skill in the label applying art and are commercially available. The label (not shown) is applied to the side of the cover 180 of the potted plant 156 before or after the fastener 184 is applied about the cover 180. The label may be an adhesive label or may be applied as an ink jet, or even by stamping. As the covered potted plant is recovered from the opening of 176 after the fastener 184 has been applied and knotted, the knotted fastener 184 slips off the vertical rod 198 and holds the cover 180 about the pot 140 or potted plant 156.

Figure 29:
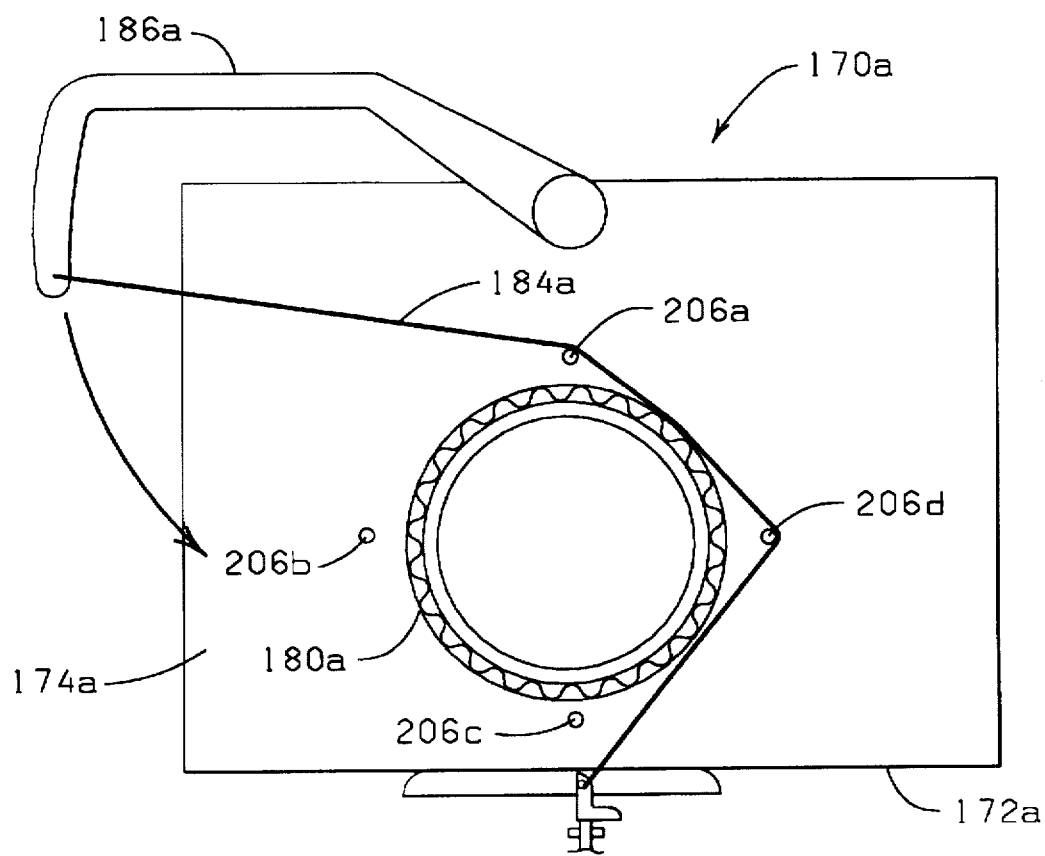
FIG. 29 is a plan view of another version of the present invention which applies a band or fastener above the upper support assembly.
Figure 30:
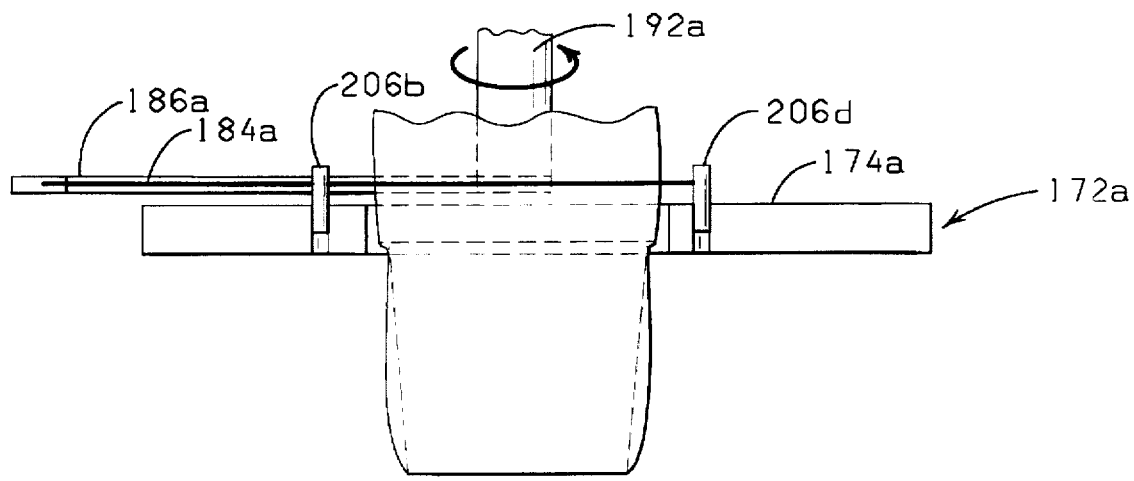
FIG. 30 is a side elevational view of the apparatus of FIG. 29 as viewed from one angle.
Figure 31:
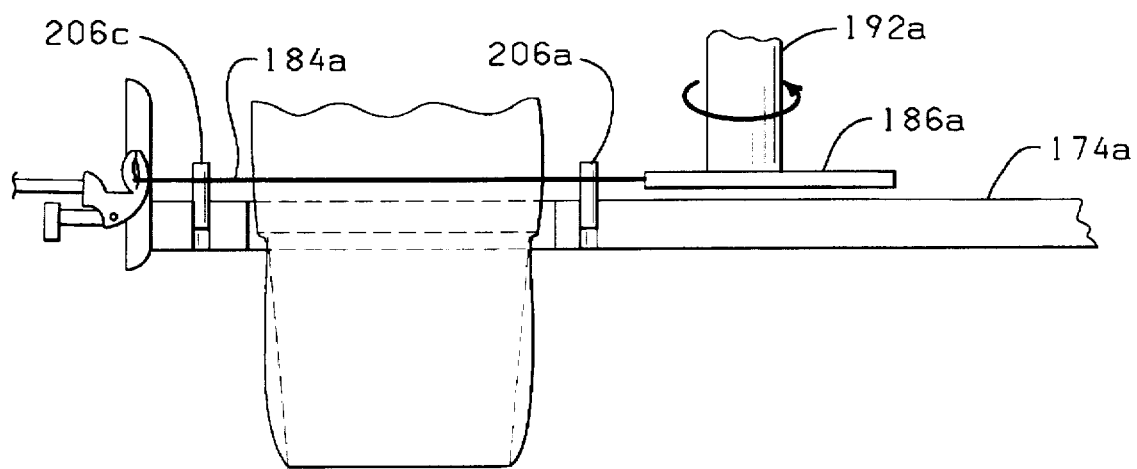
FIG. 31 is a side elevational view of the apparatus of FIG. 30 as viewed from a second angle.

Embodiments of FIGS. 29–31

Referring now to FIGS. 29–31, an alternative covering and fastening assembly is generally designated by the reference numeral 170a. The fastening assembly 170a is exactly the same as the apparatus 170 except that it is modified to apply the fastener 184a to the cover 180a in a plane above the upper support surface 174a. A tie arm 186a is supported by a tie arm shaft 192a above the upper support surface 174a. The fastener 184a is looped about a set of studs 206a–d which serve as a fastener retraction assembly and which function to relieve the stress of the fastener 184a as it is applied about the cover 180a. The studs 206a–d are reciprocatingly mounted in the upper support assembly 172a so that the studs 206a–d can be retracted into the upper support assembly 172a to allow the fastener 184a to grasp the cover 180a. The studs 206a–d can be controlled electrically, pneumatically, hydraulically or by another power source.

Figure 32:
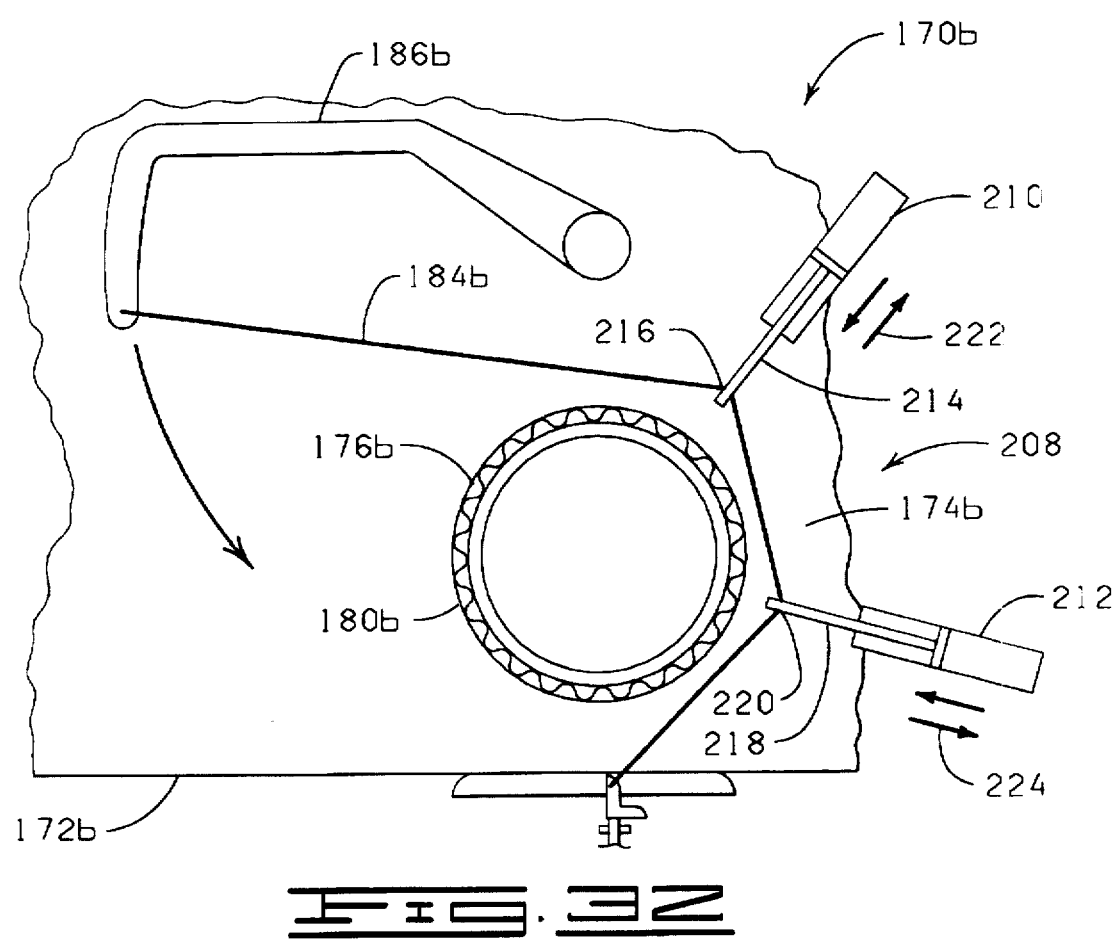
FIG. 32 is a plan view of another version of the present invention using another fastener retraction system.
Figure 33:
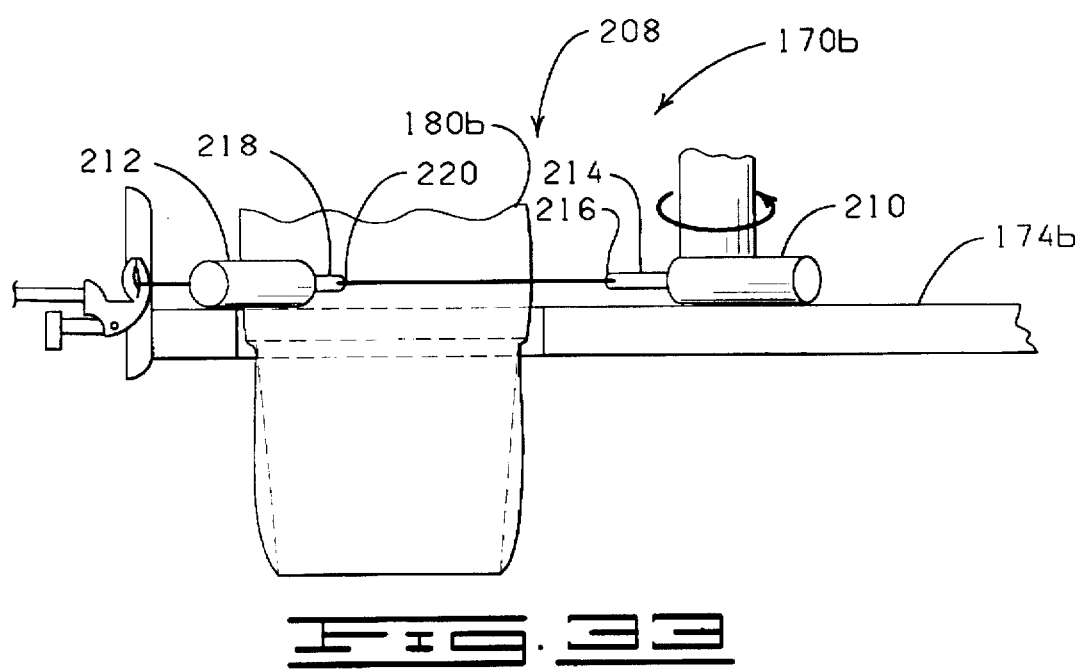
FIG. 33 is a side view of the apparatus of FIG. 32.

Embodiments of FIGS. 32–33

Referring now to FIG. 32, a covering and fastening assembly is designated by the reference numeral 170b. The assembly 170b is exactly like the assembly 170a of FIGS. 29–31 except that instead of using a plurality of studs 206a–d to function as a fastener retraction assembly, the assembly 170b uses a fastener retraction assembly 208 comprising a first retraction unit 210 and a second retraction unit 212.

The first retraction unit 210 comprises a first grasping arm 214 having a grasping end 216 for catching and holding a portion of the fastener 184b. The second retraction unit 212 comprises a second grasping arm 218 having a grasping end 220 for catching and holding a portion of the fastener 184b different from the portion of the fastener 184b held by the first grasping arm 214. The first retraction unit 210 and the second retraction unit 212 may be automatically controlled and may comprise pneumatically or hydraulically controlled pistons.

In operation, the first grasping arm 214 grasps a portion of the fastener 184b and the second grasping arm 218 grasps another portion of the fastener 184b. The first grasping arm 214 is retracted in direction 222 and the second grasping arm 218 is retracted in direction 224 until the fastener 184b is retracted to a position as shown in FIG. 32 in which the fastener 184b is drawn away from the opening 176b in the upper support surface 174b whereby the opening 176b is available for an article or pot to be deposited therein. Once a pot or article has been deposited into the opening to form a cover 180b substantially as described above for the assembly 170a, the first retraction arm 214 and the second retraction arm 218 are caused to release the fastener 184b whereby the fastener 184b engages the circumference of the cover 180b about the pot or article and holds the cover 180b thereabout. The covered pot or article can the be removed from the fastening and covering assembly 170b.

Figure 34:
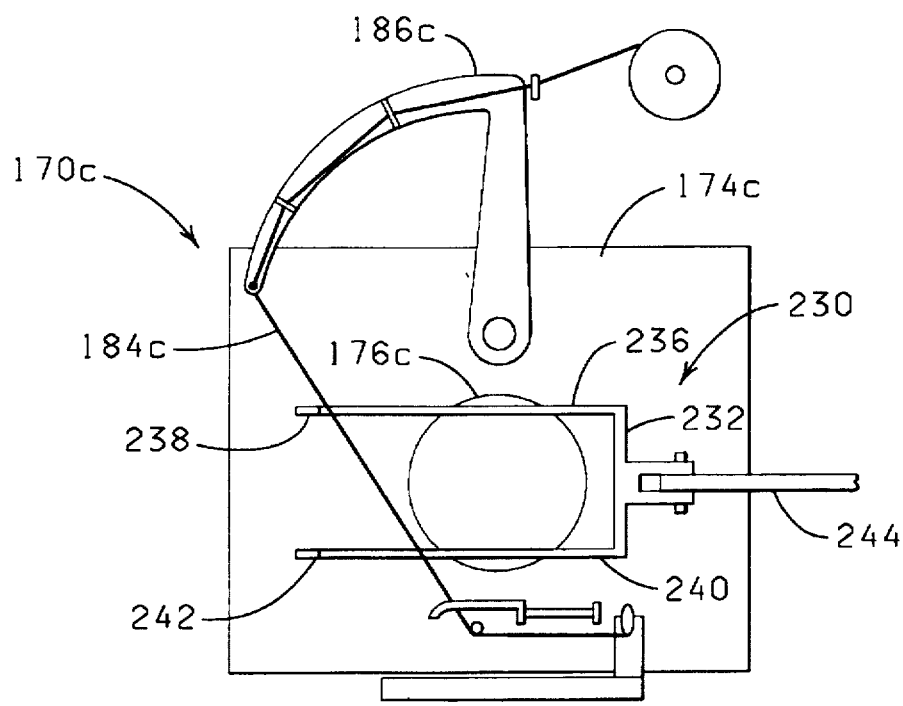
FIG. 34 is a plan view of yet another method of fastener retraction.
Figure 35:
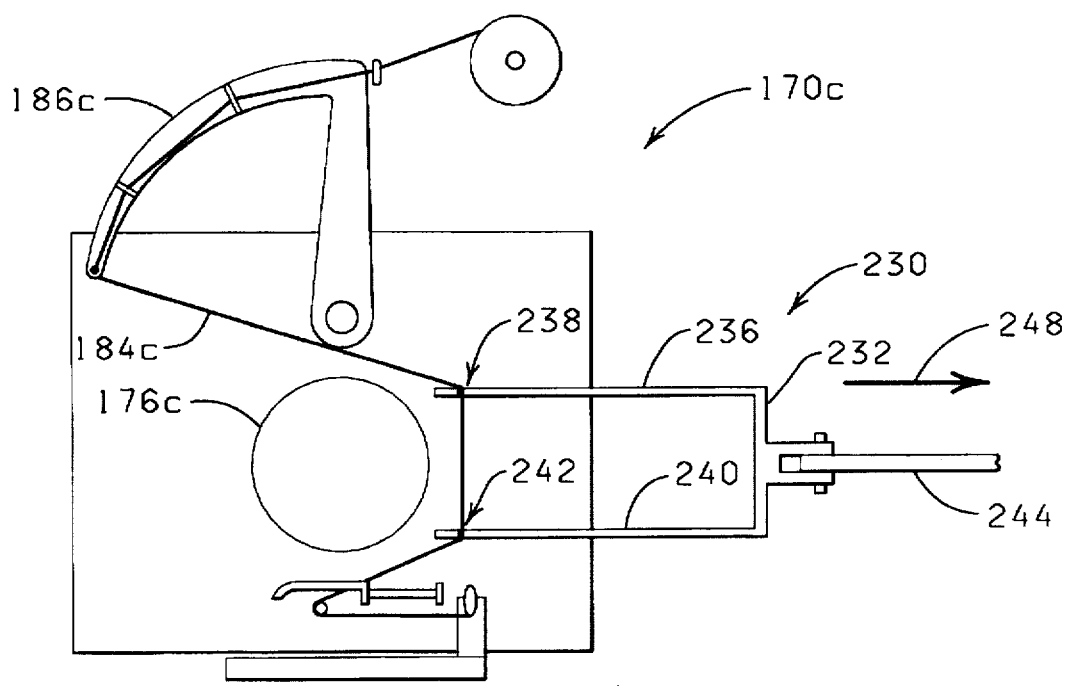
FIG. 35 is a plan view of the apparatus of FIG. 34 at a later operation phase.
Figure 36:
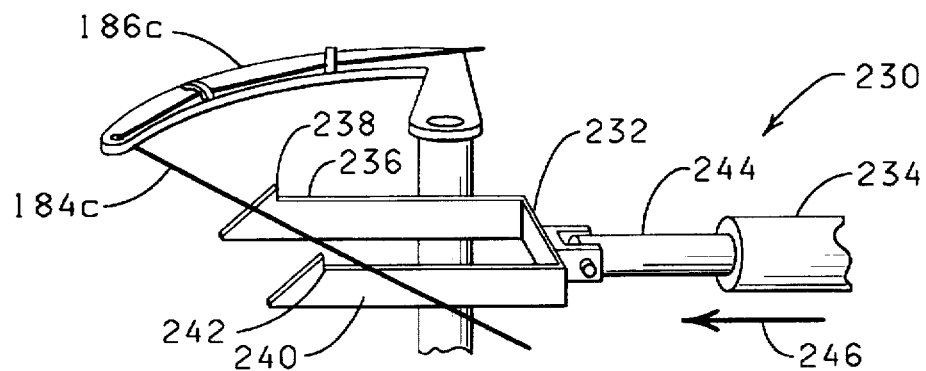
FIG. 36 is an enlarged perspective view of the fastener retraction assembly of FIG. 34.

Embodiment of FIGS. 34–36

Referring now to FIG. 34, another version of the covering and fastening assembly of the present invention is designated by the general reference numeral 170c. The assembly 170c is exactly like assembly 170b of FIGS. 32–33, except that instead of using a pair of retraction units 210 and 212, as a fastener retraction assembly, a fastener retraction assembly 230 is alternatively comprised of a U-shaped retraction arm 232 attached to a cylinder 234. The retraction arm 232 comprises a first grasping prong 236 having a grasping end 238 and a second grasping prong 240 having a second grasping end 242. The retraction arm 232 is attached to a rod 244 which is reciprocatingly disposed within the cylinder 234.

In operation, the rod 244 is advanced in direction 246 until the grasping ends 238 and 242 catch the fastener 184c. Once the retraction arm 232 has grasped the fastener 184c, the rod 244 is reciprocatingly retracted by the cylinder 234 in direction 248 until the fastener 184c has been retracted a distance sufficient to clear the opening 176c in the upper support surface of the fastening and covering assembly 170c as shown in FIG. 35. The assembly 170c is at that point prepared to proceed in the operation of applying a cover to a pot or article disposed in the opening 176c. After the pot has been disposed into the opening 176c and a cover formed thereabout, the fastener 184c is released from the fastener retraction assembly 230.

Figure 37:
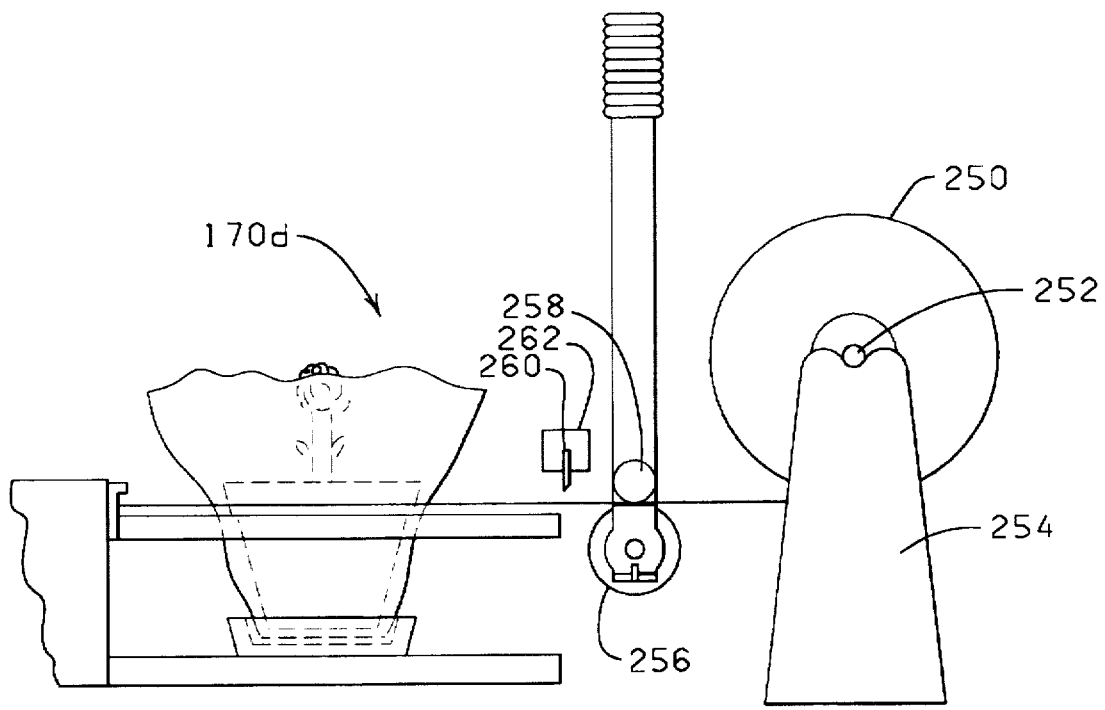
FIG. 37 is a side view of another version of the present invention in which the sheet is provided from a roll of material.

Embodiment of FIG. 37

Referring now to FIG. 37, a covering and fastening assembly is designated by the general reference numeral 170d. The assembly 170d is exactly any of assemblies 170, 170a, 170b, or 170c except that the sheet of material is supplied from a roll of material substantially as described above in the embodiment of FIG. 12.

Shown in FIG. 37 is a roll of material resting on a shaft 252 supported by a support assembly 254. A clutch assembly 256 which is driven by a drive assembly (not seen) such as a motor advances a portion of the roll of material 250 under an idler roller 258 until the portion of the roll 250 is advanced a predetermined length. A knife edge 260 which is connected to an actuator 262 serves to sever the portion of the sheet from the roll of material 250. The sheet is then ready to be used to be formed as a cover about a flower pot.

In Operation

In operation, the present invention comprises providing a covering and fastening apparatus such as the one designated by the reference numeral 170c in FIGS. 34–36. In the first operational step, a sheet of material 10 is placed on the upper support surface 174c in a cover forming position over the opening 176c. There placed, the sheet of material 10 is positioned over the cover former (not shown) mounted within the opening 176c.

In the next step, the article, or in the preferred embodiment a pot 140 containing a plant is removed from a storage position. The pot 140 is positioned over the sheet of material 10 the potted plant is disposed generally above and near the portion of the sheet of material 10 which is above the cover former mounted in the opening 176c. Then, the pot 140 is moved in a direction through the cover former toward a lower support assembly (not shown, but similar to the lower support assembly 200 shown in FIGS. 27–28) which causes the lower end of the pot 140 to engage a portion of the sheet of material 10. The pot 140 and portions of the sheet of material 10 pass through the cover former causing the sheet of material 10 to contact or nearly contact both the outer peripheral surface 144 of the pot 140 and the contacting portions of the inner perimeter of the cover former. The sheet 10 is thereby pressed about the outer peripheral surface 144 of the pot 140 thereby forming a cover 148 about the pot 140 and retaining the covered pot 140 in the opening 176c. The pot 140 is advanced through the cover former opening until the lower end 142 of the pot 140 rests on or nearly rests on the lower support assembly 330. A band or fastener 184c is automatically applied about a portion of the outer surface 150 of the cover 148 of the covered potted plant 158 by the fastening apparatus whereby the cover 148 is fasteningly secured about the pot 140. In the next step, the covered potted plant 158 is removed.

The method may comprise the optional step of manually arranging portions of the cover 148 and the exposed portions of the plant so that the cover 148 and potted plant are attractively and optimally arranged prior to the fastening step.

The method may also comprise the additional step of engaging an automatic labeling device (not shown), wherein a label (not shown) is automatically applied to a portion of the outer surface 150 of the cover 148 of the pot 140. The label may be applied to the outer peripheral surface 150 of the cover 148 or the label may be applied to the bottom (not shown) of the cover 148 through an opening in the lower support assembly 200.

Figure 38:
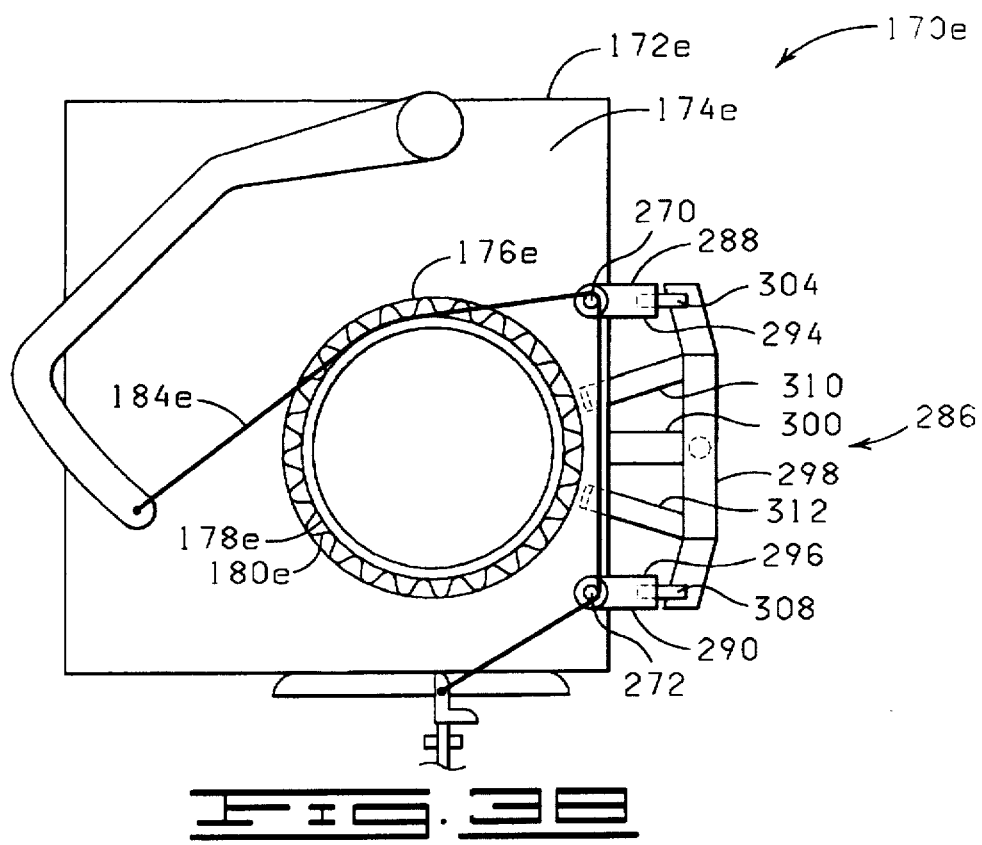
FIG. 38 is a plan view of another version of the present invention using another fastener retraction system.
Figure 39:
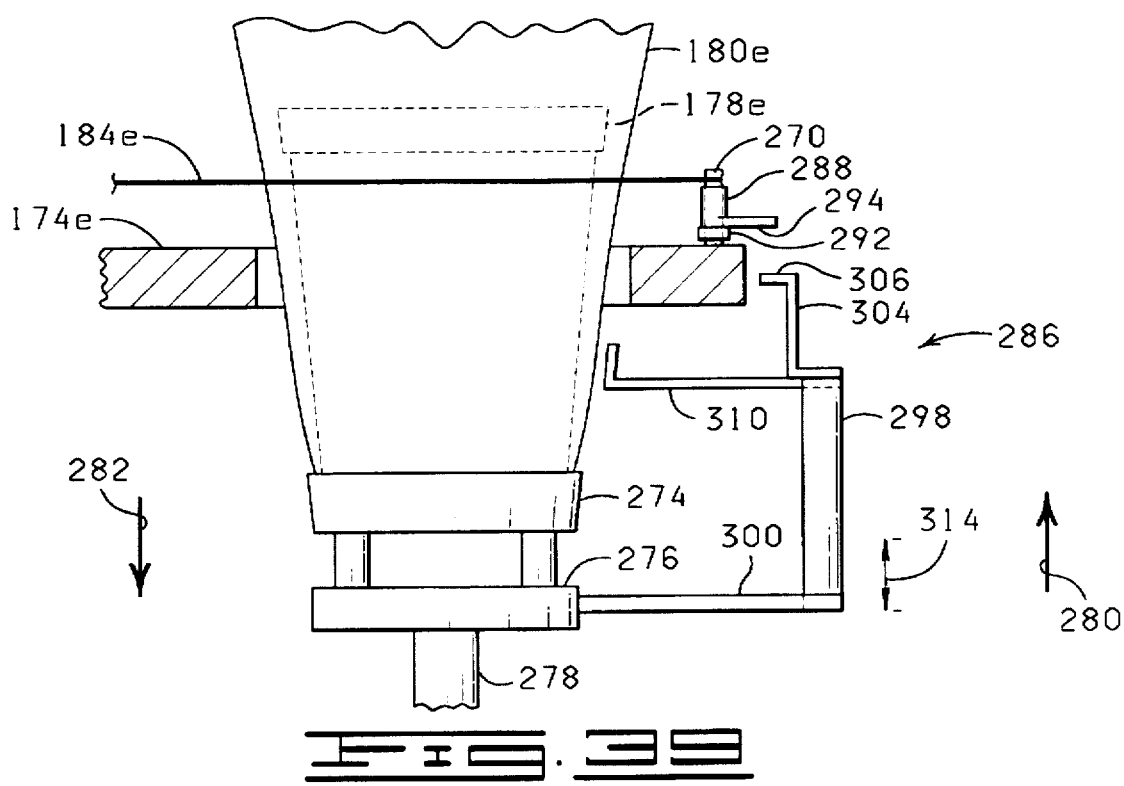
FIG. 39 is a side view of the version of FIG. 38 shown in one stage of operation.
Figure 40:
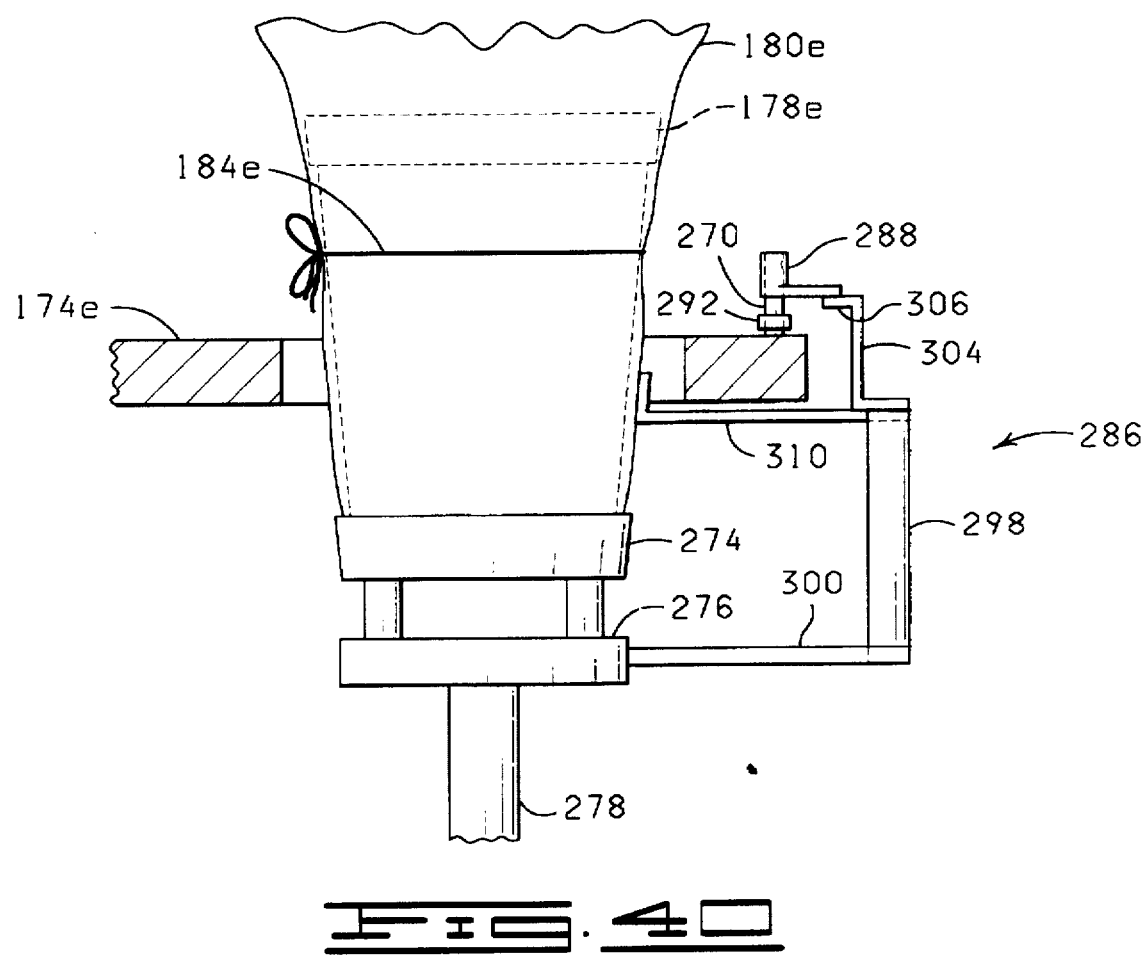
FIG. 40 is a side view of the version of FIG. 38 shown in a stage of operation subsequent to the stage shown in FIG. 39.

Embodiments of FIGS. 38–40

Referring now to FIGS. 38–40, another version of the present invention is designated by the general reference numeral 170e. The fastening assembly 170e is exactly the same as the assembly 170a in FIGS. 29–31 except in the construction of the mechanism for retracting and releasing the fastener. The fastening assembly 170e comprises an upper support assembly 172e having an upper support surface 174e which has an opening 176e. A pot 178e having a cover 180e is shown in the opening 176e. A fastener 184e is looped about a first retraction pin 270 and a second retraction pin 272. Pin 270 is stationarily mounted upon the upper support surface 174e. Similarly, pin 272 is stationarily mounted upon the upper support surface 174e. The pot 178e is supported by a pot base cup 274 which is supported on a base plate 276. Base plate 276 is mounted on a reciprocating piston 278 which can be manually or automatically caused to urge the base plate 276 and base plate cup 278 in an upward direction 280 or a downward direction 282.

The fastener assembly 170e further comprises a pin stripping assembly 286. The function of the pin stripping assembly 286 is to strip the fastener 184e from the pins 270 and 272 after the fastener 184e has been tied to allow the tied fastener 184e to engage and bind the cover 180e about the pot 178e. The pin stripping assembly 286 comprises a first stripper 288 and a second stripper 290. The first stripper 288 strips the fastener 184e from the first pin 270. The second stripper 290 strips the fastener 184e from the second pin 272. Each stripper 288 and 290 is disposed about the pins 270 and 272, respectively, in such a manner that the stripper is able to reciprocatingly slide up and down the pin. Each pin 270 and 272 has a stop. One such stop is shown in FIGS. 39 and 40 and is designated by the reference numeral 292. The stop 292 functions to prevent the stripper 288 from sliding too far down the pin 270. The stop 292, if present, may be adjustable. Each stripper 288 and 290 has an arm 294 and 296, respectively.

The pin stripping assembly 286 further comprises a support frame 298 which is connected to the base plate 276 via a support arm 300. Connected to the upper end of the support frame 298 is a first stripper lifting post 304 which has an upper end 306 and a second stripper lifting post 308, also which has an upper end (not shown).

The stripper assembly 286 further comprises a first pot restraint 310 connected to the support frame 298 and a second pot restraint 312 also connected to the frame 298. The pot restraints 310 and 312 function to prevent the pot 178e from leaning in the direction of the fastener pins 270 and 272 when tension is applied by the fastener 184e to the side of the pot 178e which is opposite the pins 270 and 272.

In operation, the stripper assembly 286 is activated when the base plate 276 is urged upwardly in direction 280. The base plate 276 is lifted by the piston 278 a predetermined distance 314. At this point, the upper end of the pot 178e has been "ejected" or elevated to a position at least partially beyond the opening 176e in the support surface 174e in order to facilitate removal of the covered pot from the covering assembly.

FIG. 39 shows the pot orientation before the base plate 276 is lifted and FIG. 40 shows the pot orientation after the base plate 276 is lifted a distance 314 in direction 280. During the process of lifting the base plate 276 to eject the covered pot 178e, each stripper lifting post 304 and 306 is elevated and each engages, respectively, the arms 294 and 296 of strippers. 288 and 290. When, for example, stripper lifting post 304 is elevated, the upper end 306 engages arm 294 of stripper 288, causing the stripper 288 to be slidingly elevated upwardly along the pin 270 and causing the fastener 184e to be released from the pin 270. The action is repeated for the portion of the fastener 184e which is engaged by pin 272. The fastener assembly 286 can then be moved downwardly in direction 292 in preparation of repeating the process.

It will be understood by one of ordinary skill in the art that each of the covering and fastening assemblies discussed herein above may be outfitted with means for enabling the apparatus to be mobile, for example, with wheels or casters. It will also be understood that each of the covering and fastening assemblies amy be used with a labeling apparatus for applying a label to the covered pot. Each covering and fastening system may also be used in conjunction with an automatic sheet feeding apparatus.

Changes may be made in the construction and the operation of the various components, elements and assemblies described herein or in the steps or the sequence of steps of the methods described herein without departing from the spirit and scope of the invention as defined in the following claims.

What is claimed is:

1. An apparatus for forming and fastening a cover to an article having an open upper end, a lower end and an outer peripheral surface such that the open upper end of the article remains substantially uncovered, the apparatus comprising:
    a platform having an opening extending therethrough, the platform adapted to support at least one sheet of material such that a portion of the sheet of material is positioned generally over the opening in the platform;
    a cover forming member disposed in the opening in the platform, the cover forming member having contacting portions for contacting the sheet of material and forming the sheet of material into a cover extending about at least a portion of the outer Peripheral surface of the article such that the open upper end of the article remains substantially uncovered when the article and at least a portion of the sheet of material are moved through the opening in the platform and into contact with the cover forming member; and
    means for automatically applying a fastener about a portion of the cover and for fastening the cover about the article such that the open upper end of the article remains substantially uncovered.

2. The apparatus of claim 1 further comprising means for releasably securing the sheet of material on the platform and for generally immobilizing the sheet of material on the platform.

3. The apparatus of claim 1 further comprising means for automatically placing the sheet of material on the platform such that at least a portion of the sheet of material is positioned generally over the opening in the platform.

4. The apparatus of claim 1 further comprising means for moving the platform.

5. The apparatus of claim 1 further comprising means for automatically moving the article from an article supply and for moving the article into the opening in the platform.

6. The apparatus of claim 1 wherein the fastener for fastening the cover about the article is selected from a group consisting of elastic string, non-elastic string, a band, wire, thread, ribbon, wire and tape.

7. The apparatus of claim 1 further comprising means for automatically removing the covered article from the opening in the platform.

8. The apparatus of claim 1 wherein the means for applying the fastener applies the fastener about a portion of the cover at a position above the cover forming member.

9. The apparatus of claim 1 wherein the means for applying the fastener applies the fastener about a portion of the cover at a position below the cover forming member.

10. The apparatus of claim 1 further comprising fastener retraction means for retracting the means for automatically applying a fastener about at least a portion of the cover so as to enhance removal of the covered article from the opening in the platform.

11. The apparatus of claim 1 further comprising means for automatically elevating the covered article to a position at least partially above the platform for facilitating removal of the covered article from the platform.

12. An apparatus for forming and fastening a cover about an article having an upper end, a lower end and an outer peripheral surface such that the upper end of the article remains substantially uncovered, the apparatus comprising:
    a platform having an opening extending therethrough, the platform adapted to support a sheet of material such that a portion of the sheet of material is disposed generally over the opening in the platform;
    a cover forming member disposed in the opening in the platform, the cover forming member having contacting portions for contacting the sheet of material and forming the sheet of material into a cover extending about the article whereby the upper end of the article remains substantially uncovered when the article is moved in a predetermined direction such that the lower end of the article engages a portion of the sheet of material disposed over the opening in the platform and the sheet of material and the article are moved through the opening in the platform and into contact with the contacting portion of the cover forming member disposed in the opening in the platform, whereby the contacting portion of the cover forming member engage the sheet of material and form the sheet of material into a cover disposed about at least a portion of the outer peripheral surface of the article;

means for automatically applying a fastener about a portion of the cover for fastening the cover about the article such that the upper end of the article remains substantially uncovered; and means for automatically applying a label to a portion of the cover.

13. The apparatus of claim 12 further comprising means for releasably securing the sheet of material on the platform and for generally immobilizing the sheet of material on the platform.

14. The apparatus of claim 12 further comprising means for automatically positioning the sheet of material on the platform such that at least a portion of the sheet of material is positioned generally over the opening in the platform.

15. The apparatus of claim 12 further comprising means for automatically moving the article from an article supply and for moving the article into the opening in the platform.

16. The apparatus of claim 12 wherein the fastener for fastening the cover about the article is selected from a group consisting of elastic string, non-elastic string, a band, wire, thread, ribbon, wire and tape.

17. The apparatus of claim 12 further comprising means for automatically removing the covered article from the opening in the platform.

18. The apparatus of claim 12 wherein the means for applying the fastener applies the fastener about a portion of the cover at a position above the cover forming member.

19. The apparatus of claim 12 wherein the means for applying the fastener applies the fastener about a portion of the cover at a position below the cover forming member.

20. The apparatus of claim 12 further comprising fastener retraction means for retracting the means for automatically applying a fastener applied about at least a portion of the cover so as to enhance removal of the covered article from the opening in the platform.

21. The apparatus of claim 12 further comprising means for automatically elevating the covered article to a position at least partially above the platform for facilitating the removal of the covered article from the platform.

22. The apparatus of claim 12 further comprising means for moving the platform.

* * * * *

UNITED STATES PATENT AND TRADEMARK OFFICE
CERTIFICATE OF CORRECTION

PATENT NO. : 5,740,664
DATED : April 21, 1998
INVENTOR(S) : Donald E. Weder et al.

It is certified that error appears in the above-identified patent and that said Letters Patent is hereby corrected as shown below:

Title page,
After "[73] Assignee: Southpac Trust International, Inc." insert,
-- [*] This patent is subject to a Terminal Disclaimer --

Column 5,
Line 52, delete "arrange" and substitute -- a range -- therefor

Column 11,
Line 21, delete "is"
Line 30, delete "comprises" and substitute -- comprise -- therefor Column 12,
Line 20, delete "beforehand" and substitute -- before and -- therefor
Line 25, delete "30f" and substitute -- 10f -- therefore Column 13,
Line 8, delete "by," and substitute therefor -- by --

Column 26,
Line 14, delete "Peripheral" and substitute therefor -- peripheral --

Drawings,
Fig. 2, delete the lead line from the numeral "28" and insert a new lead line designating the first end.
Fig. 7, extend the lead line from the numeral "20d" to indicate the upper surface of the first sheet of material 10d.
Fig. 14, delete the lead line from the numeral "146" and insert a new lead line designating the upper end of the pot 140.
Fig. 15, please insert the numeral -- 20i -- and its associated lead line.
Fig. 17, please insert the numeral -- 10i -- and its associated lead line.
Fig. 20, please insert the numeral -- 52j -- and its associated lead line.
Fig. 22, please delete the numeral "56" and substitute -- 56j -- therefor; and please insert the numeral -- 24j -- and its associated lead line.
Fig. 24, please delete the numeral "45k" indicating the growing medium and substitute therefor -- 43k -- and delete the numeral "52k" and its associated lead line.
Fig. 28, please insert the numeral -- 172 -- and its associated lead line.
Fig. 30, please insert the numeral -- 180a -- and its associated lead line.
Fig. 31, please insert the numeral -- 180a -- and its associated lead line.
Fig. 32, please delete the reference numeral "186b" and its associated lead line.

UNITED STATES PATENT AND TRADEMARK OFFICE
CERTIFICATE OF CORRECTION

PATENT NO. : 5,740,664
DATED : April 21, 1998
INVENTOR(S) : Donald E. Weder et al.

It is certified that error appears in the above-identified patent and that said Letters Patent is hereby corrected as shown below:

In the Drawings (cont.),

Fig. 33, please insert the reference numeral -- 184b -- and its associated lead line.
Fig. 34, please delete the reference numeral "186c" and its associated lead line.
Fig. 35, please delete the reference numeral "186c" and its associated lead line; and please add the numeral -- 174c -- and its assocated lead line.
Fig. 36, please delete the reference numeral "186c" and its associated lead line.
Fig. 37, please add the numerals -- 140 -- and -- 148 -- and each associated lead line.
Fig. 39, please insert the numerals -- 172e -- and 176e -- and each associated lead line.

Column 2,
Line 6, delete "sectional" and substitute therefor -- cross-sectional --;
Lines 27-28, delete "(diagrammatically shown in FIG. 11)";
Line 41, delete "a" and substitute -- the -- therefor;
Line 52, delete "partial";
Line 54, delete "partial";
Line 57, delete "partial";
Line 63, delete "sectional" and substitute therefor -- cross-sectional --;

Column 3,
Line 3, delete "sectional" and substitute therefor -- cross-sectional --;
Line 5, after "a" and before "plan" insert -- top --;
Line 8, delete "side elevational view" and substitute therefor -- fragmented side elevational view, partially in cross section, --;
Line 10, delete "side elevational view" and substitute therefor -- fragmented side elevational view, partially in cross section, --;
Line 15, delete "side elevational view" and substitute therefor -- fragmented side elevational view, partially in cross section, --;
Line 17, delete "side elevational view" and substitute therefor -- fragmented side elevational view, partially in cross section, --;
Line 19, after "a" and before "plan", insert -- partial top --;
Line 21, after "side" and before "view" insert -- elevational --;
Lines 22-23, delete "method of fastener retraction." and substitute therefor -- fastener retraction assembly. --;

Column 4,
Line 28, delete "pick an place" and substitute -- pick and place -- therefor;

UNITED STATES PATENT AND TRADEMARK OFFICE
CERTIFICATE OF CORRECTION

PATENT NO. : 5,740,664
DATED : April 21, 1998
INVENTOR(S) : Donald E. Weder et al.

It is certified that error appears in the above-identified patent and that said Letters Patent is hereby corrected as shown below:

Column 5,
Line 28, delete "material," and substitute -- material 10, -- therefor;
Line 30, delete "material." and substitute -- material 24. -- therefor;
Line 34, after "sheet" and before "10" insert -- of material --;
Line 44, after "material" and before "and" insert -- 24 --;

Column 6,
Line 25, delete "reason" and subsitute -- reasons -- therefor;
Line 27, after "material" and before "has" insert -- 10 --;
Line 29, after "material" and before "is" insert -- 10 --;

Column 7,
Line 2, after "material" and before "and" insert -- 26 --;
Line 11, delete "20" and substitute -- 10 -- therefor;
Line 25, after "material" and before "may" insert -- 24 --;
Line 26, after "surface" and before "of" insert -- 20 --;
Line 41, delete "a single flower" and substitute therefor -- a single flower, --;
Line 57, delete "a portion of" (second occurrence);

Column 8,
Line 7, delete "wrapping" and substitute -- sheet of -- therefor;
Lines 22-23, delete "And/Or synthetic organic polymer" and substitute -- and/or Synthetic Organic Polymer -- therefor;
Line 38, after "material" and before "may" insert -- 24 --;

Column 9,
Line 42, delete "material 20*d*." and substitute -- material 26*d*. -- therefor;

Column 10,
Line 13, delete "spaces 76. Between" and substitute therefor -- spaces 78 between --;
Line 15, delete "space 76" and substitute -- space 78 -- therefor
Line 60, delete "material 94" and substitute -- material 92 -- therefor;
Line 61, delete "material." and substitute -- material 10. --;
Line 63, delete "material." and substitute -- material 26. -- therefor;

UNITED STATES PATENT AND TRADEMARK OFFICE
CERTIFICATE OF CORRECTION

PATENT NO. : 5,740,664
DATED : April 21, 1998
INVENTOR(S) : Donald E. Weder et al.

It is certified that error appears in the above-identified patent and that said Letters Patent is hereby corrected as shown below:

Column 11,
Line 7, after "in" and before "particular" insert -- a --;
Line 11, after "materials" and before "are" insert -- 92, 94 --;
Line 12, after "materials" and before "are" insert -- 92, 94 --;
Line 18, delete "are" and substitute -- is -- therefor;
Line 27, after "material" and before "as" insert -- 10 and 26, --;
Line 39, after "sheets of material" insert -- 10 and 26, --;
Line 54, delete "have" and substitute -- has -- therefor;
Line 56, delete "are" and substitute -- is -- therefor;
Line 61, delete "have" and substitute -- has -- therefor;
Line 67, after "material" and before "as" insert -- 10 and 26, --;

Column 12,
Lines 5-6, delete "sheets of material" and substitute therefor -- materials --;
Line 43, after "or a first sheet" insert -- of material --;
Line 54, delete "platform." and substitute -- platform (not shown). -- therefor;
Line 63, delete "20*i*" and substitute therefor -- 144 --;
Line 64, delete "20*i*" and substitute therefor -- 144 --;

Column 13,
Lne 16, after "material" and before "may" insert -- 10*i* --;
Line 30, delete "FIGS. 19-22" and substitue -- FIGS. 19-25 -- therefor;

Column 14,
Line 43, after "space" and before "of" insert -- 44*j* --;

Column 15,
Line 1, delete "distance" and substitute -- distances -- therefor;
Line 11, after "folds" insert -- 66f --;
Line 13, after "folds" and before "or" insert -- 66f --;
Line 14, delete "folds" insert -- 66f. --;
Line 24, delete "skirt" and substitute -- sheet -- therefor;
Line 26, after "grouping" insert -- 48j, --;
Line 27, after "end" and before "of" insert -- 52j --;
Line 27, delete "grouping." and substitute -- grouping 48j. -- therefore;
Line 33, delete "of material" and substitute -- extension 28j -- therefor;
Line 60, delete "10k" and substitute therefor -- 24k --;

UNITED STATES PATENT AND TRADEMARK OFFICE
CERTIFICATE OF CORRECTION

PATENT NO. : 5,740,664
DATED : April 21, 1998
INVENTOR(S) : Donald E. Weder et al.

It is certified that error appears in the above-identified patent and that said Letters Patent is hereby corrected as shown below:

Column 16,
Line 17, delete "22$k$" and substitute therefor -- 20$k$ --;

Column 17,
Line 22, delete "45$k$" and substitute -- 43$k$ -- therefor;
Line 24, delete "45$k$." and substitute -- 43$k$ -- therefor;
Line 41, delete "10$k$" and substitute -- 30$k$ -- therefor;
Line 45, delete "10$k$." and substitute -- 30$k$. -- therefor;
Line 65, delete "maybe" and substitute -- may be -- therefor;

Column 19,
Line 11, after "material" insert -- 10 --;
Line 17, after "material" and before "to" insert -- 10 --;

Column 20,
Line 4, after "material" and before "used" insert -- 10 --;
Line 19, after "material" and before "in" insert -- 10 --;

Column 21,
Line 8, delete "pick an place" and substitute therefor -- pick and place --;
Line 64, delete "machines" and substitute -- assemblies -- therefor;
Line 66, delete "machine" and substitute -- assembly -- therefor;

Column 22,
Line 27, after "opening" delete "of";
Line 44, delete "support assembly" and substitute therefor -- platform --;
Line 46, delete "support assembly" and substitute therefor -- platform --;

Column 23,
Line 15, delete "retraction" and substitute -- grasping -- therefor;
Line 16, delete "retraction" and substitute -- grasping -- therefor;
Line 19, delete "the be" and substitute -- then be -- therefor;
Line 29, delete "234." and substitute -- 234 (FIG. 36). -- therefor;
Line 41, after "surface" and before "of" insert -- 174$c$ --;
Line 55, after "material" and before "resting" insert -- 250 --;
Line 63, after "cover" and before "about" insert -- 148 --;
Line 63, delete "pot." and substitute -- pot 140. -- therefor;

UNITED STATES PATENT AND TRADEMARK OFFICE
CERTIFICATE OF CORRECTION

PATENT NO. : 5,740,664
DATED : April 21, 1998
INVENTOR(S) : Donald E. Weder et al.

It is certified that error appears in the above-identified patent and that said Letters Patent is hereby corrected as shown below:

Column 24,
Line 10, after "10" and before "the" insert -- and --;
Line 27, delete "330" and substitute therefor -- 200 --;
Line 64, delete "base plate cup 278" and substitute -- base cup 274 -- therefor;

Column 25,
Line 42, delete "306" and substitute -- 308 -- therefor;
Line 50, delete "fastener" and substitute -- stripper -- therefor;
Line 51, delete "292" and substitute -- 282 -- therefor;
Line 58, delete "amy" and substitute -- may -- therefor.

Signed and Sealed this

Twenty-second Day of January, 2002

*Attest:*

*Attesting Officer*

JAMES E. ROGAN
*Director of the United States Patent and Trademark Office*